United States Patent
Srinivasan et al.

(10) Patent No.: US 11,803,766 B1
(45) Date of Patent: Oct. 31, 2023

(54) ACTIVE SCANNING TOOL FOR IDENTIFYING CUSTOMER MISCONFIGURATIONS OF VIRTUAL MACHINE INSTANCES

(71) Applicant: Amazon Technologies, Inc., Seattle, WA (US)

(72) Inventors: Preethi Srinivasan, Herndon, VA (US); Sreekanth Reddy Polaka, Aldie, VA (US); Christopher Wooram Yi, Woodbridge, VA (US); John David Backes, Minneapolis, MN (US); Everett Richard Anthony, Herndon, VA (US); Aparna Nagargadde, Herndon, VA (US); Mark Edward Stalzer, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 692 days.

(21) Appl. No.: 16/712,242

(22) Filed: Dec. 12, 2019

(51) Int. Cl.
*G06N 5/04* (2023.01)
*H04L 9/40* (2022.01)
*G06F 9/455* (2018.01)

(52) U.S. Cl.
CPC ............ *G06N 5/04* (2013.01); *G06F 9/45558* (2013.01); *H04L 63/1433* (2013.01); *H04L 63/20* (2013.01); *G06F 2009/45579* (2013.01)

(58) Field of Classification Search
CPC .......................... G06F 21/577; G06F 9/45558
See application file for complete search history.

(56) References Cited

U.S. PATENT DOCUMENTS

| | | | |
|---|---|---|---|
| 9,438,618 B1* | 9/2016 | Sultan et al. | G06F 21/53 |
| 2015/0040228 A1* | 2/2015 | Lee et al. | H04L 41/40 |
| | | | 726/25 |
| 2020/0366483 A1* | 11/2020 | White et al. | H04L 9/0631 |
| 2021/0152588 A1* | 5/2021 | Cruz et al. | G06F 8/65 |

\* cited by examiner

*Primary Examiner* — Jason K Gee
(74) *Attorney, Agent, or Firm* — Lee & Hayes, P.C.

(57) ABSTRACT

An automated security assessment service of a service provider network may identify, and notify a customer of, misconfigured VM instances that can be access (e.g., via the Internet). A scanner tool may call an automated reasoning service to identify any VM instances of a customer that can be accessed, and may receive information from the automated reasoning service that is usable to exchange packets with those identified instances. The scanner tool can use the information to send requests to the identified instances. After receiving responses from the identified instances, the scanner tool can store, in storage of a network-based storage service, and in association with a customer account of the customer, encrypted data about the results of the scan (e.g., any VM instances that are vulnerable to attackers), and this encrypted data is thereby accessible to the customer with proper decrypt permissions.

21 Claims, 12 Drawing Sheets

ACTIVE SCANNING TOOL FOR IDENTIFYING CUSTOMER MISCONFIGURATIONS OF VIRTUAL MACHINE INSTANCES

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide customers with on-demand delivery of compute power, database storage, applications, and other resources, rather than the customers having to make upfront investments in hardware and spend time and resources managing the hardware.

A customer of a service provider network can set up one or more virtual private clouds (VPCs). These VPCs are configured with public and private subnets, as well as Internet gateways (IGWs). In the public subnets, Web Application Proxy servers (or "proxies") can be implemented using Internet-accessible virtual machine (VM) instances to provide external users with secure inbound connectivity to the customer's web applications without requiring virtual private network (VPN) connectivity. If the customer is an organization, for example, this allows users outside of the organization to access the organization's internal web applications over the Internet. However, unless a customer properly configures the VM instances running the customer's proxies, attackers may be able to exploit misconfigurations to gain access to sensitive information of the customer, such as the customer's credentials. Depending on the access permissions obtained through such a vulnerability, the attacker may have unchecked access to a number of the customer's resources in the service provider network.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
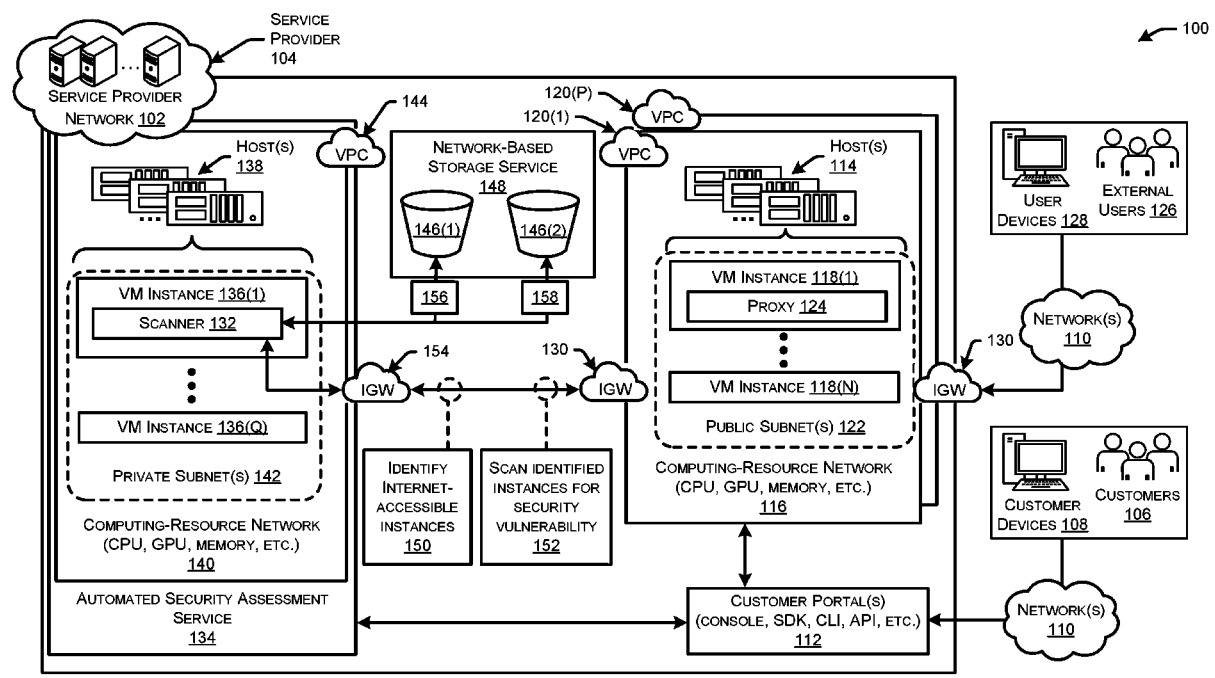
FIG. 1 illustrates a system-architecture diagram of an example environment in which a scanner tool can be implemented to identify Internet-accessible instances of a customer that are vulnerable to attackers.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (sometimes referred to herein as "customers," or "subscribers") need not invest in and maintain the computing infrastructure required to implement the various services that they may need. Additionally, customers (and sometimes their clients) are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide customers with scalable, on-demand, and network-accessible computing platforms over large geographic regions such that the customers have readily-available VM instances at their disposal. These service provider networks allow customers to immediately have computing infrastructure over large geographic regions to fulfill individual computing needs of the customer, and also to provide computing resources to support services provided to clients of the customers.

For example, a customer of the service provider network may be an individual, company, and/or other organization that has an online service that they would like to provide to clients who desire to access the online service. However, the customer may desire to provide access to their online service to clients over large geographic regions, and for large amounts of users. The amount of computing infrastructure (e.g., compute power, memory, storage networking, security, etc.) used to support and maintain such an online service over different geographic regions may be large enough to be impractical for customers, particularly new or emerging businesses, to purchase and maintain on their own.

Accordingly, service provider networks may provide services, such as compute services, which deploy, operate, and scale compute capacity in the service provider network on behalf of customers. Such services may provide groups, or "fleets," of virtual machine instances (e.g., VM instances, instances, etc.) that execute on computing resources of the service provider network to fulfill the computing-service needs of the customer. A customer of the service provider network may set up one or more virtual private clouds (VPCs), which are configured with public and private subnets, as well as Internet gateways (IGWs). In the public subnets, the customer can implement Web Application Proxy servers (or "proxies") using Internet-accessible virtual machine (VM) instances to provide external users with secure inbound connectivity to the customer's web applications without requiring virtual private network (VPN) connectivity. If the customer is an organization, for example, this allows users outside of the organization to access the organization's internal web applications over the Internet. However, unless a customer properly configures the VM instances running the customer's proxies, attackers may be able to exploit the misconfigurations to gain access to sensitive information of the customer, such as the customer's credentials. Depending on the access permissions obtained through such a vulnerability, the attacker may have unchecked access to a number of the customer's resources in the service provider network.

This disclosure describes, among other things, techniques and systems implemented by an automated security assessment service of a service provider network for identifying, and notifying a customer of, misconfigured VM instances that can be accessed (e.g., via the Internet). Misconfigured, accessible (e.g., Internet-accessible) VM instances may be vulnerable to attackers who are able to exploit the misconfigured instance(s). To identify instance misconfigurations, a scanner tool may execute (e.g., on its own VM instance) to identify, among the VM instances allocated to a given customer, any VM instances that can be accessed (e.g., via the Internet). To identify these VM instances, the scanner tool may call an automated reasoning service that can return, to the scanner tool, information that is usable to exchange packets with a set of VM instances identified by the automated reasoning service. This information may include at least a set of network protocols and a set of ports that are within a range of port numbers. Once these accessible (e.g., Internet-accessible) VM instances are identified via the automated reasoning service, the scanner tool can use the information provided by the automated reasoning service to send requests (e.g., over the Internet) to the identified instances. The scanner tool can determine that an identified instance is misconfigured if the identified instance responds to the request in a way that exposes a security vulnerability. For example, an instance may be identified as vulnerable if the instance returns metadata (e.g., over the Internet) to the scanner tool. In some embodiments, the metadata returned to the scanner tool may comprise an identifier (ID) of a machine image that was used to launch the identified instance. Even though the identified instance may not return sensitive credentials of the customer, receipt of the ID of the machine image is enough for the scanner tool to deduce that other sensitive information, such as credentials (e.g., a secret key, access key, etc.), of the customer may be accessible to an attacker. After receiving responses from the identified instances, the scanner tool can store, in storage of a network-based storage service, and in association with a customer account of the customer, encrypted data about the results of the scan. For example, if the scanner tool received metadata from an identified instance in response to a request (e.g., a request transmitted over the Internet), the scanner tool can store encrypted data for the customer indicating that the identified instance is vulnerable to attackers based on receipt of the metadata from the identified instance in response to requesting the metadata. The customer, with proper decrypt permissions, can access and read this encrypted data so that the customer is notified of any of its VM instances that may be vulnerable to attackers. The customer may then take remedial action, such as by reconfiguring the identified VM instance, to better secure their data.

The techniques described herein for identifying misconfigurations of VM instances involve an "active" scanning approach, as opposed to conventional, "passive" security assessment that runs as a background process and does not otherwise interfere with the components of the system it is monitoring; a passive approach merely gathers data silently in the background. By contrast, the techniques and systems described herein use an active scanning approach to effectively stress test (or "poke") selectively-identified VM instances by sending requests (e.g., over the Internet) to those VM instances requesting metadata in return. If a security vulnerability is discovered as a result of this stress test, the customer can be notified of where the vulnerability was found (e.g., which VM instance returned metadata as requested), how the vulnerability was found (e.g., the packet(s) sent to the VM instance over the Internet), and possibly the downstream impact of the discovered vulnerability (e.g., which resources of the customer may be affected), and the like. In this manner, the customer can remain apprised of potential instance vulnerabilities, which may involve instances running Web Application Proxy servers in a public subnet of the customer's VPC.

Although it is possible to stress test every VM instance allocated to the customer using the active scanning approach described herein, the techniques and systems described herein are directed to selecting particular VM instances of the customer to "poke" based on whether the VM instance is accessible (e.g., via the Internet) or not. This aspect of the present disclosure may utilize the aforementioned automated reasoning service to select the instances that are worthwhile to investigate for security vulnerabilities, thereby avoiding potentially wasteful consumption of resources on instances that are not worthwhile investigating for security vulnerabilities. For example, VM instances that are not accessible (e.g., via the Internet) can remain undisturbed in order to mitigate any impact that the active scanning may have on computing resources, networking resources, etc. In this manner, the automated security assessment service takes a cautious approach to eliminate, or at least mitigate, service interruptions for the customer. In addition, it may be impractical to stress test all of the customer's instances, especially when the number of executing instances allocated to a give customer may be on the order of hundreds of thousands of instances, or even more. Once accessible (e.g., Internet-accessible) instances are identified, the active scanning of those identified instances can also occur in batches at a scheduled interval to help eliminate, or at least mitigate, service interruptions for the customer. For example, the scanner tool can send a predetermined number (e.g., ten) of requests for metadata at a time, in batches, which allows for efficiency gains through parallelization, without causing service interruption for the customer.

An example process implemented by one or more computing devices of a service provider network may include calling an automated reasoning service to identify, as one or more identified instances of one or more VM instances allocated to a customer of the service provider network, one or more VM instances that can be accessed, and receiving, from the automated reasoning service, information that is usable to exchange packets with the one or more identified instances, the information including at least a set of network protocols and a set of ports that are within a range of port numbers. The one or more computing devices may send a request to an identified instance of the one or more identified instances using the information received from the automated reasoning service. Based at least in part on the request, the one or more computing devices may receive a response from the identified instance, and may determine, based at least in part on the response, whether the identified instance exposes a security vulnerability via a port associated with the identified instance. The one or more computing devices may store, in storage of a network-based storage service, and in association with a customer account of the customer, encrypted data indicating, for example, that the identified instance is vulnerable to attackers based on the response indicates that the identified instance has exposed a security vulnerability.

By actively scanning accessible (e.g., Internet-accessible) VM instances of a customer's account to detect vulnerabilities due to misconfigurations, and by storing results of the scan in storage accessible over a network to customers with proper decrypt permissions, a customer can remain apprised of security vulnerabilities in their deployed VM instances that are accessible (e.g., via the Internet). The techniques and systems described herein may be implemented to detect misconfigurations in a customer's instances that are running Web Application Proxy servers in a public subnet of the customer's VPC to provide external users (i.e., users outside of an organization) with access to internal web applications of the customer. The scanner tool described herein can proactively identify misconfigurations and notify the customer by storing its findings in a secure, customer-accessible storage location so that the customer can remediate the detected vulnerabilities, and thereby keep sensitive information secure from attackers.

While some of the techniques are described herein as being performed in a service provider network of a service provider, the techniques may similarly be applied in other computing networks, such as on-premise servers managed by customers themselves. Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a scanner tool can be implemented to identify Internet-accessible instances of a customer that are vulnerable to attackers. As illustrated, a service provider network 102 may be operated and/or managed by a service provider 104. The service provider network 102 may provide various services to users to fulfill their computing resource needs, such as cloud-based computing resources. For example, the service provider network 102 may provide cloud-based, scalable, and network accessible (or network-based) compute power services, storage services, database services, and/or other services. The service provider network 102 (which may be referred to as a cloud provider network, or sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To utilize the network accessible (or network-based) services, customers 106 may utilize customer devices 108 to register for an account (e.g., a customer account, subscriber account, etc.) with one or more of the network-based services. This may allow the customers 106 (sometimes referred to herein as "subscribers" 106) to subscribe to a network-based service, and to provide their own clients with access to online service(s) without the customers 106 having to invest in the computing resources (e.g., on-premise resources) needed to host their own online services. Generally, the customer devices 108 may comprise any type of computing device that may be utilized to access the service provider network 102. For instance, the customer devices 108 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 102.

Customers 106 may utilize the customer devices 108 to access the service provider network 102 over one or more networks 110 (e.g., the Internet, wireless wide area networks (WANs), personal area networks (PANs), wired and/or wireless local area networks (LANs), etc.). The network(s) 110 may comprise any type of network or combination of networks, including wired and/or wireless networks. In some embodiments, the customers 106 can access one or more network-based services of the service provider network 102 via one or more customer portals 112, such as, without limitation, a web-based console, a software-development kit (SDK), a command-line interface (CLI), an application programming interface (API), and/or any other suitable means.

In an illustrative example, the customer 106 may utilize a compute service (e.g., a compute capacity service) of the service provider network 102, which may be fully managed by the service provider 104 and may deploy, operate, and scale compute resources in the cloud-based, or network-based, environment. For example, such a compute service may utilize one or more host computers 114 in a computing-resource network 116 to instantiate one or more virtual machine (VM) instances 118 allocated to the customer 106. These VM instances 118 can be managed by a script, program, and/or application, etc. In some embodiments, the compute service may provide auto-scaling capabilities such that instances 118 can be spun up or spun down based on customer demand.

The computing-resource network 116 may include data centers that each include one or more computing resources, such as the VM instances 118. FIG. 1 shows VM instances 118(1)-(N), where "N" is any positive integer. The VM instances 118 can be referred to herein collectively as "VM instances 118" or just "instances 118"). The data centers of the computing-resource network 116 may house the host computers 114 and may be located across disparate geographical regions such that computing resources are available to support functionality for cloud-based services provided by the service provider network 102. The computing resources of the computing-resource network 116 may include various combinations of hardware-based components, such as central processing units (CPU), graphics processing units (GPU), memory, storage, network capacity, security, and/or any other type of hardware-based resource to support cloud-based services, such as a network-based compute service, database service, storage service, etc. In some examples, the computing resource network 116 may further include respective memories that store various firmware-based and/or software-based resources that provide the functionality of the services, such as the VM instances 118.

An individual VM instance 118 functions as a virtual computing environment for the customer 106. A customer 106 may use a preconfigured template to launch a new VM instance 118, such as a machine image that packages bits for use in the deployment of the customer's 106 software/applications, including an operating system for the VM instance 118. An individual VM instance 118 may be of a particular type, among multiple possible types that are defined in terms of CPU, memory, storage, and/or networking capacity.

A customer 106 may set up one or more virtual private clouds (VPCs) 120, which are configured with public and private subnets, as well as Internet gateways (IGWs). FIG. 1 depicts VPCs 120(1)-(P), where "P" is any positive integer. The VPC 120(1), for example, is shown as including a public subnet(s) 122. In the public subnet(s) 122, the customer 106 can implement, or setup, network address translation (NAT) instances for outbound Internet access, and Remote Desktop Gateway instances in an Auto Scaling group for inbound remote administrative access. Furthermore, elastic Internet Protocol (IP) addresses may be associated with the instances 118 in the public subnet(s) 122. Although not shown in the customer's 106 VPC 120(1), a private subnet(s) may be used to implement, or setup, Active Directory domain controllers, which may act as enterprise certificate authorities (CAs) that issue Secure Socket Layer (SSL) certificates to an Active Directory Federation Services infrastructure. Furthermore, Active Directory Federation Services servers may execute in the private subnet(s) of the VPC 120 to authenticate users and provide security tokens to applications or federated partner applications that trust Active Directory Federation Services. It is to be appreciated that a given VPC 120 of the customer 106 may be configured with multiple public subnets 122 and multiple private subnets across multiple availability zones.

In the public subnet(s) 122, the customer 106 can implement, or setup, one or more Web Application Proxy servers 124 (or "proxies" 124) using a VM instance(s) 118(1) that is accessible via the Internet. The proxy 124 role may be configured to make Active Directory Federation Services accessible to external users 126 by proxying requests without requiring without requiring virtual private network (VPN) connectivity. This may provide the external users 126 with secure inbound connectivity to the customer's 106 web applications, and the proxy 124 may selectively publish and pre-authenticate connections to these internal web applications. If the customer 106 is an organization, for example, this allows the external users 126 (e.g., users outside of the organization) to access the customer's 106 internal web applications over the Internet. To this end, the external users 126 may utilize user devices 128 to access the proxy 124 over the network 110 (e.g., the Internet) via the IGW 130 of the VPC 120(1). It is to be appreciated that the network(s) 110 used by the external users 126 may be the same as, or different from, the network(s) 110 used by the customers 106 to access the service provider network 102. Generally, the user devices 128 may comprise any type of computing device that may be utilized to access the service provider network 102; specifically via the IGW 130 of a customer's 106 VPC 120. For instance, the user devices 128 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 102.

To be notified of any vulnerabilities in the customer's 106 instances 118 (e.g., due to the customer 106 having misconfigured an instance(s) 118), the customer 106 may opt-in to using a scanner tool 132 (or "scanner" 132) of an automated security assessment service 134. In general, the automated security assessment service 134 may be configured to help improve the security and compliance of applications deployed in the service provider network 102. The customer 106 may opt-in to using the scanner 132 by employing a customer device 108 to send an initial request to the automated security assessment service 134 requesting to scan the customer's account, and to report misconfigurations of Internet-accessible VM instances 118 amongst a plurality of VM instances allocated to the customer 106. For example, the customer 106 may be allocated VM instances that may not be accessible via the Internet in addition to the VM instances 118 shown in FIG. 1, which are executing within a public subnet(s) 122 of the VPC 120(1). In some embodiments, the initial request from the customer 106 may prompt the customer to input parameter settings into a template, such as, without limitation, a customer managed key (CMK). Based on the parameter settings input by the customer 106, the automated security assessment service 134 may launch a VM instance 136(1) to host the scanner 132 that will identify Internet-accessible instances 118 of the customer 106, and will scan those identified instances 118 to determine whether any are misconfigured, and therefore vulnerable to attackers.

As shown in FIG. 1, the automated security assessment service 134 may utilize one or more host computers 138 in a computing-resource network 140 to instantiate one or more VM instances 136 for hosting scanners 132 for various customers 106 who opt-in to using the scanners 132. FIG. 1 shows VM instances 136(1)-(Q), where "Q" is any positive integer, and each VM instance 136 may represent a VM instance 136 that is launched in response to a customer 106 request to scan the customer's account. These VM instances 136, like the VM instances 118, can be managed by a script, program, and/or application, etc. In some embodiments, the automated security assessment service 134 may provide auto-scaling capabilities such that instances 136 can be spun up or spun down on demand.

The computing-resource network 140 may include data centers that each include one or more computing resources, such as the VM instances 136. The data centers of the computing-resource network 140 may house the host computers 138 and may be located across disparate geographical regions such that computing resources are available to support functionality for cloud-based security services provided by the service provider network 102. The computing resources of the computing-resource network 140 may include various combinations of hardware-based components, such as CPU, GPU, memory, storage, network capacity, security, and/or any other type of hardware-based resource to support cloud-based security services. In some examples, the computing resource network 140 may further include respective memories that store various firmware-based and/or software-based resources that provide the functionality of the security services, such as the VM instances 136.

FIG. 1 also shows that the VM instance 136 may execute within a private subnet(s) 142 of a VPC 144 setup by the automated security assessment service 134. In this way, the VM instance 136 - which launched on behalf of the customer 106 who opted-in to using the scanner 132 - may be launched in a private subnet(s) 142 behind its own NAT gateway, for example, to ensure that public Secure Shell (SSH) access is prevented by default, and which allows for contacting the hosts 114 of the customer's 106 instances 118 through the Internet.

In addition to launching the VM instance 136(1) to host the scanner 132, the automated security assessment service 134 may, based on the parameter settings input by the customer 106, create a first storage container 146(1) associated with the customer's account for storing encrypted data relating to reported misconfigurations of instances 118 discovered by the scanner 132. Misconfigurations of instances 118 may include misconfigurations of proxies 124 running on the instances 118. This first storage container 146(1) (sometimes referred to herein as a "bucket" 146) may be provided as part of a network-based storage service 148, and may be associated with the customer account of the customer 106 who opted in to using the scanner 132. In other words, the first storage container 146(1) is owned by the customer 106 opting into the security scanning service. The first storage container 146(1) may have Server-Side Encryption using a unique identifier (e.g., resource name) of a Customer Managed Key (CMK) created in a key management service. In some embodiments, a second storage container 146(2) of the network-based storage service 148 may be created for storing access logs for the first storage container 146(1).

When the scanner 132 is executed to identify customer misconfigurations of instances, the scanner 132 may initially identify 150 Internet-accessible instances allocated to the customer 106. For example, the scanner 132 may identify 150, as one or more identified instances of a plurality of VM instances allocated to the customer 106, one or more VM instances 118 that can be accessed via the Internet. Oftentimes, a customer 106 may have upwards of hundreds of thousands of instances 118 that are accessible via the Internet. Accordingly, the identification 150, in many cases, may identify a plurality of Internet-accessible instances 118 (e.g., 500,000 Internet-accessible instances) that are allocated to the customer 106 in the service provider network 102. In some embodiments, the scanner 132 may request another component or service (e.g., an automated reasoning service - See FIG. 2A) of the service provider network 102 to obtain a snapshot of a network configuration for the customer account of the customer 106 in order to identify Internet-accessible instances 118. A "snapshot" is a point-in-time snapshot of a network configuration for the customer account, including VPCs, IGWs, IP addresses, ports, network protocols, network paths (e.g., ingress paths to instances via the Internet), other network connections, and the snapshot may further include a set of instantiated instances of the customer's 106 account. A snapshot can model the network configuration for the customer account as a data file, such as a JavaScript Object Notation (JSON) object or file. The component or service obtaining the snapshot of the network configuration for the customer account may make various calls, such as instance 118 describe calls, VPC 120 describe calls, load balancer describe calls, and the like. In this manner, the snapshot of the network configuration for the customer account may include a point-in-time network configuration for the customer account, as well as a complete set of the instances allocated to the customer 106. Using this snapshot, reachability analysis may be performed to identify Internet-accessible instances 118 amongst the instances allocated to the customer account. For example, the reachability analysis may identify instances that are accessible (e.g., using Transmission Control Protocol (TCP), User Datagram Protocol (UDP), and/or similar protocols) via the Internet through ports that are within a range of port numbers. For example, queries can be issued against the snapshot to determine instances 118 accessible over the Internet via Ports 80 (HTTP), 443 (HTTPS), 3128, and so on. Based on such a query, a list of instances 118 having port numbers in the range of port numbers may be returned, the list specifying the identifier (ID) of the instance 118, as well as the Internet Protocol (IP) addresses and port number(s) associated with the instance 118, for each instance in the list. The reachability analysis may further determine a set of network protocols usable to connect to the identified instances 118 via the ports having the in-range port numbers. The reachability analysis may further determine paths (or network paths) that can be traversed to target the identified instances 118. It may be the case that an instance 118 is accessible via multiple different ingress paths from the Internet, and the reachability analysis may determine from various network appliances, like load balancers, which ingress paths are available to target a given instance 118. Some of these paths may take a relatively larger number of hops in a relatively circuitous path than others. For example, although some determined paths may take a direct path from the Internet (via an IGW 130) to the instance in as few hops as possible, others may traverse multiple network appliances, such as load balancers, along the way to the instance. In addition, multiple different paths may occur through a common ingress point (eg., if an ingress point is an IGW). Paths may also differ in their protocol, destination address, and/or destination port.

After identifying 150 the Internet-accessible instances 118, the scanner 132 may actively scan 152 the identified instances 118 to determine whether one or more of the instances 118 expose a security vulnerability by sending, over the Internet (e.g., via the IGW 154 of the VPC 144 and the IGW 130 of the VPC 120(1)), requests to the identified instances 118. These requests may comprise requests that use a network protocol in the set of network protocols determined from the reachability analysis. For example, the requests may comprise a HTTP request, HTTPS request, and/or a request corresponding to another protocol that is usable to listen on a port of an accessible instance 118. The protocol of the request may depend on the port number through which the instance 118 is accessible. The requests may be sent using the IP addresses and the port numbers returned in the list of identified instances 118. The requests may be constructed with parameters that cause the requests to traverse the paths that were determined from the reachability analysis. For example, multiple requests may be constructed with parameters to check all possible ingress paths from the Internet to a given instance 118 identified as accessible. For example, if a path is determined from the Internet, via the IGW 130, through a load balancer, to the instance 118 in question, the parameters of the request may include the IP addresses and the ports along the path that includes the load balancer. A request that traverses a more direct path may include other parameters that include the IP addresses and the ports for the IGW 130 and the host 114 of the instance 118, but not of the load balancer of the more circuitous path. In an illustrative example, a request may be constructed to request that an identified instance return metadata associated with the identified instance 118. For example, a request for metadata may be sent over the Internet to the VM instance 118(1) shown in FIG. 1, and, in response, the scanner 132 may receive, over the Internet, the requested metadata from the VM instance 118(1). For example, the VM instance 118(1) may return an identifier (ID) of a machine image that was used to launch the VM instance 118(1). Even though the VM instance 118(1) may not return sensitive credentials of the customer 106, receipt of the ID of the machine image is enough for the scanner 132 to deduce that other sensitive information, such as credentials (e.g., a secret key, access key, etc.), of the customer 106 may be accessible to an attacker. The scanner 132 may receive responses from a plurality of Internet-accessible instances 118, some returning the requested metadata and some not returning the requested metadata. Here, "metadata" associated with the instance 118 may be data residing outside of the instance 118 itself that is about the instance 118, such as an ID of the machine image that launched the instance 118. As the scanner 132 continues to receive responses from instances 118 over a period of time, the scanner 132 may store progress data, which may include publishing the progress of the scan to a monitoring and observability service log group specified in the customer's 106 parameter settings. The customer 106 may use a customer device 108 to access this progress data to check the status of a current scan, if desired. Furthermore, the scanner 132 may store encrypted data 156 indicating the results of the scan in the first storage container 146(1), and may store access log data 158 for the first storage container 146(1) in the second storage container 146(2). Continuing with the running example, since the VM instance 118(1) returned the requested metadata (e.g., an ID of the machine image) to the scanner 132, the scanner may store, in the first storage container 146(1) of the network-based storage service 148, and in association with the customer account of the customer 106, encrypted data 156 indicating that the VM instance 118(1) is vulnerable to attackers based at least in part on the receiving of the metadata from the VM instance 118(1). In this manner, the customer 106 can use a customer device 108 to send a read request to read the encrypted data 156, and the network-based storage service 148 can determine that the customer device 108 and/or the customer 106 has decrypt permissions (e.g., for a CMK input as a parameter setting by the customer 106 when opting into using the scanner 132), decrypt the encrypted data, and send unencrypted data to the customer device 108 for viewing by the customer 106. In the running example, the customer 106 may see that the VM instance 118(1) is vulnerable to attackers, and may decide to reconfigure the VM instance 118(1) to run the proxy 124 securely such that it cannot be exploited by an attacker.

It is to be appreciated that FIG. 1 depicts an example architecture in which the techniques described herein may be implemented, but that other architectures may be employed. For example, in FIG. 1, the VPC 144 hosting the scanner 132 may run within a given customer's 106 account in order to access the VPC 120(1) of the customer account, but this implementation is non-limiting. That is, the scanner 132 may run outside of the customer account that it is configured to access. Additionally, or alternatively, the scanner 132 may be configured to access a single customer account or multiple different customer accounts. Additionally, or alternatively, the scanner 132 may not be implemented using an instance 136(1) executing on a host computer 138, and may instead be implemented on a serverless architecture, for example. For example, the scanner 132 may execute in a container, or some other serverless function instead of running on the instance 136(1).

Figure 2A:
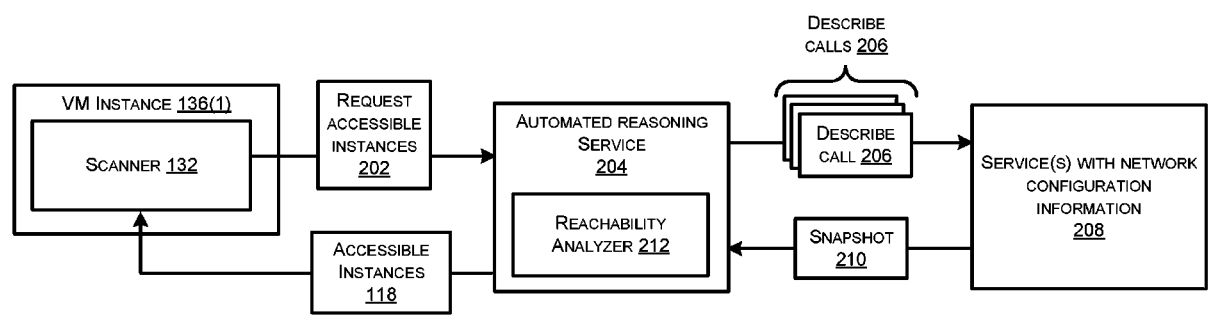
FIG. 2A illustrates a schematic diagram showing an example technique for identifying instances of a customer account to scan.

FIG. 2A illustrates a schematic diagram showing an example technique for identifying instances of a customer account to scan. FIG. 2A shows the scanner 132 executing on a VM instance 136(1) to identify Internet-accessible instances 118 allocated to the customer 106. As mentioned above, although FIG. 2A shows that the scanner 132 may execute on a VM instance 136(1), it does not have to. For example, the scanner 132 may instead execute in a container or some other serverless function instead of running on the instance 136(1).

FIG. 2A shows that the scanner 132 may call, at 202, an automated reasoning service 204 of the service provider network 102 to request that the automated reasoning service 204 identify Internet-accessible instances 118. In response to the call made at 202 to obtain a snapshot, the automated reasoning service 204 may make one or more describe calls 206, such as instance 118 describe calls, VPC 120 describe calls, load balancer describe calls, and the like. These describe calls 206 can be made to one or more services 208 of the service provider network 102 that have network configuration information about customer accounts of customers 106 of the service provider network. Based on the describe calls 206, a snapshot 210 of the network configuration for a customer account may be returned to the automated reasoning service 204. This snapshot 210 may include a point-in-time network configuration for the customer account, as well as a complete set of the instances allocated to the customer 106. Using this snapshot 210, a reachability analyzer 212 of the automated reasoning service 204 may use logic (e.g., mathematical models, rules, criteria, etc.) to determine which of the instances allocated to the customer are "reachable" via the Internet. This reachability analysis may identify instances that are accessible (e.g., using TCP, UDP, and/or similar protocols) via the Internet through ports that are within a range of port numbers. For example, queries can be issued against the snapshot 210 to determine instances 118 accessible over the Internet via Ports 80 (HTTP), 443 (HTTPS), 3128, and so on. Based on such a query, a list of accessible instances 118 having port numbers in the range of port numbers may be returned, the list specifying the ID of the instance 118, as well as the IP addresses and port number(s) associated with the instance 118, for each instance in the list. The reachability analysis may further determine a set of network protocols usable to connect to the identified instances 118 via the ports having the in-range port numbers. The reachability analysis may further determine paths that can be traversed to target the identified instances 118. As mentioned, it may be the case that an instance 118 is accessible via multiple different ingress paths from the Internet, and the reachability analysis may determine from various network appliances, like load balancers, which ingress paths are available to target a given instance 118. Some of these paths may take a large number of hops in a relatively circuitous path, while others may take a more direct path from the Internet to the instance in as few hops as possible.

Figure 2B:
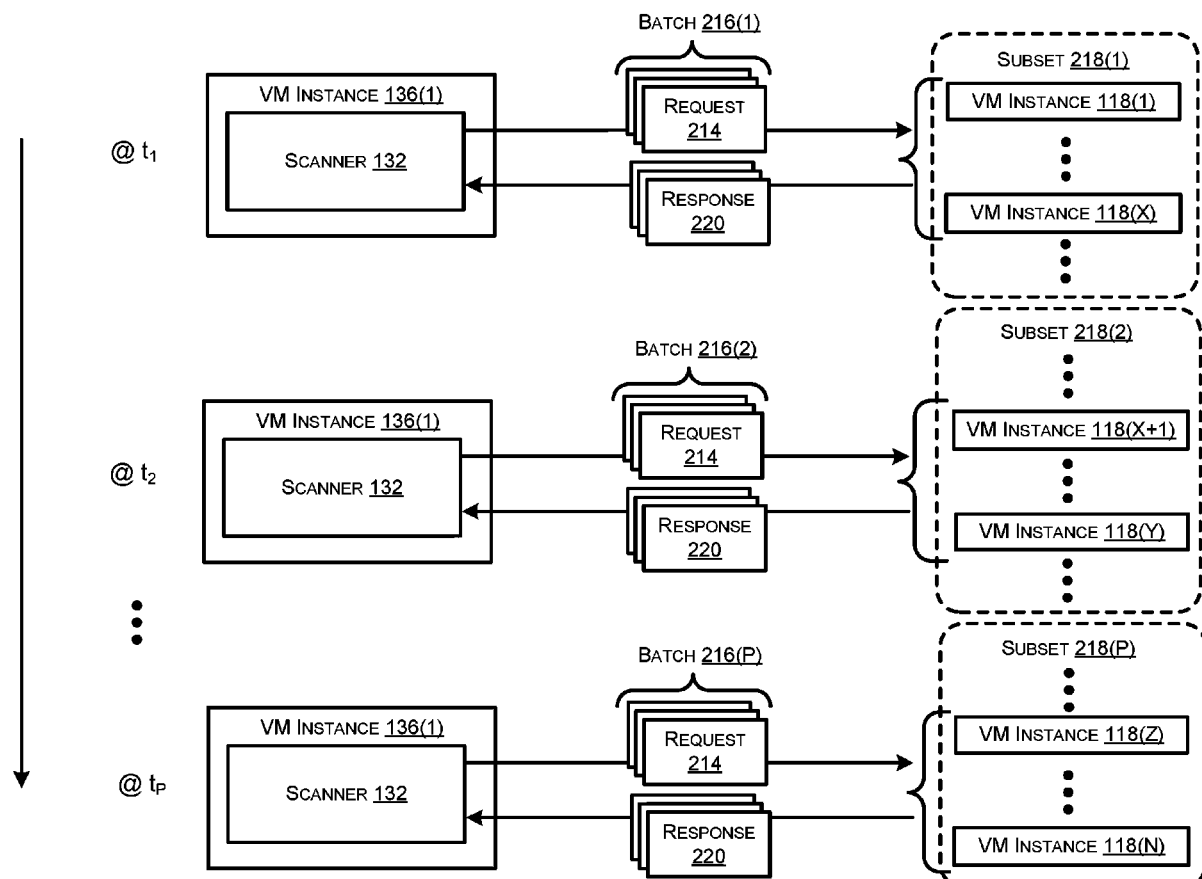
FIG. 2B illustrates a schematic diagram showing an active scanning technique for identifying Internet-accessible instances of a customer that are vulnerable to attackers.

FIG. 2B illustrates a schematic diagram 200 showing an active scanning technique for identifying Internet-accessible instances of a customer 106 that are vulnerable to attackers. As discussed with reference to FIG. 1, the scanner 132 is configured to actively scan 152 the instances 118 identified as being accessible via the Internet by sending requests 214 (e.g., requests for metadata) to the identified instances 118 over the Internet. Again, although FIG. 2B shows that the scanner 132 may execute on a VM instance 136(1), it does not have to. For example, the scanner 132 may instead execute in a container or some other serverless function instead of running on the instance 136(1). These requests 214 may represent HTTP requests, HTTPS requests, and/or requests corresponding to other protocols in the set of network protocols determined from the reachability analysis of the automated reasoning service 204. The protocol of the request may depend on the port number through which a particular instance 118 is accessible. Furthermore, the requests 214 may be constructed with parameters that cause the requests 214 to traverse paths that were determined from the reachability analysis of the automated reasoning service 204. For example, multiple requests 214 may be constructed for a given instance 118 to check all possible ingress paths from the Internet to the given instance 118. In some cases, for a given customer 106, the scanner 132 may identify (e.g., using the automated reasoning service 204) a large number of instances 118 that are Internet-accessible. In the example of FIG. 2B, consider a case where the number of Internet-accessible instances 118(1)-(N) identified by the scanner 132 for a given customer 106 is a relatively large number, such as N = 500,000 instances. In this example, instead of sending all 500,000 requests 214 at once, the scanner 132 may be configured to send multiple requests 214 in batches 216 (e.g., batches of ten requests 214 at a time) to respective subsets 218 of the identified instances 118(1)-(N), and the scanner 132 may send these batches 216 at a scheduled interval (e.g., every few seconds, minutes, etc.). In the example of FIG. 2B, at time, $t_1$, the scanner 132 may send, over the Internet, a first batch 216(1) of first requests 214 to a first subset 218(1) of multiple Internet-accessible instances 118 (e.g., requesting that the first subset 218(1) return metadata associated with subset 218(1) of the instances 118(1)-(X), where "X" may equal any suitable integer, such as X = 10). These requests 214 may be sent using the specific network protocols in the set of network protocols determined from the reachability analysis of the automated reasoning service 204, and using the IP addresses and port numbers determined. The requests 214 may also traverse particular paths from the Internet to the identified instances 118 of the first subset 218(1) based on the parameters of the requests 214. In response to sending the first batch 216(1) of first requests 214, the scanner 132 may receive responses 220 from the VM instances 118(1)-(X). Any misconfigured instance(s) 118 may send a response 220 that is indicative of the instance(s) 118 exposing a security vulnerability. For example, if a response 220 contains requested metadata, such as an ID of a machine image used to launch the subset 218(1) of instances 118(1)-(X), this may indicate that the instance 118 that sent the response 220 is exposing a security vulnerability. At time, $t_2$, the scanner 132 may send, over the Internet, a second batch 216(2) of second requests 214 to a second subset 218(2) of multiple Internet-accessible instances 118 (e.g., requesting that the second subset 218(2) return metadata associated with subset 218(2) of the instances 118(X+1)-(Y), where "Y" may equal any suitable integer, such as Y = 20). In response to sending the second batch 216(2) of second requests 214, the scanner 132 may receive responses 220 from the VM instances 118(X+1)-(Y). Again, any misconfigured instance(s) 118 may send a response 220 that is indicative of the instance(s) 118 exposing a security vulnerability (e.g., if the response 220 contains requested metadata, such as an ID of a machine image used to launch the subset 218(2) of instances 118(X+1)-(Y)). This sending of batches 216 of requests 214 may continue at a scheduled interval until requests 214 have been sent to, and responses 220 have been received from, the set of Internet-accessible instances 118(1)-(N). FIG. 2B illustrates a last batch 216(P) of requests 214 being sent at time, $t_p$, to a last subset 218(P) of instances 118(Z)-(N), where "Z" may equal any suitable integer less than "N". Accordingly, from top-to-bottom in FIG. 2B, the sending of requests 214 in batches sequentially can be thought of as "scanning" the instances 118 from a first subset 218(1) to a last subset 218(P), as indicated by the directional arrow on the left of FIG. 2B.

The automated security assessment service 134 may select any suitable number of requests 214 to include in each batch 216 as a default number, such as ten requests 214 per batch 216. By sending multiple requests 214 per batch 216, at least some requests 214 can be parallelized (or, sent in parallel), such as by using a multi-threaded process. The number of requests 214 per batch 216 can be selected as a number that is low enough to prevent a service interruption for the customer 106, yet high enough to gain some efficiencies. In some embodiments, the customer 106 may be able to set a parameter to increase this default number of requests 214 that are sent in each batch 216. For example, if a parameter setting in the customer account was set by the customer 106 to a number of 50,000 requests per batch 216, the scanner 132 may send larger batches 216 of requests 214 so that a greater number of requests 214 can be parallelized. Thus, with authorization of the customer 106 to do so, greater efficiencies can be achieved.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3A:
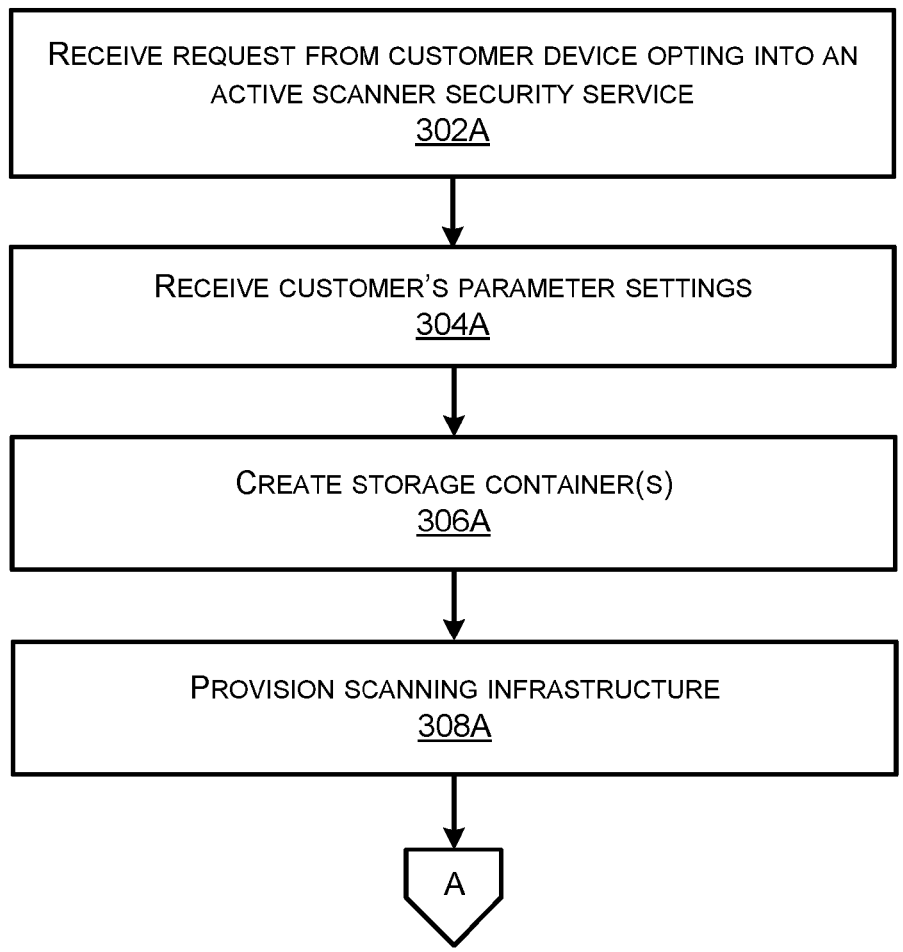
FIG. 3A illustrates a flow diagram of an example process for setting up a scanner tool based on a customer request to opt-in to an active scanner security service, according to an embodiment.

FIG. 3A illustrates a flow diagram of an example process 300A for setting up a scanner tool based on a customer request to opt-in to an active scanner security service, according to an embodiment. For discussion purposes, the process 300A is described with reference to the previous figures.

At 302A, a computing device(s) of a service provider network 102 may receive an request from a customer device 108 for a customer 106 to opt into an active scanner security service. In some embodiments, this opt-in request may result in granting permissions for particular components of, or used by, the automated security assessment service 134 in order to access the customer's 106 account ID for their customer account.

At 304A, the computing device(s) of the service provider network 102 may receive parameter settings that the customer 106 input via the customer device 108. These parameter settings received at block 304A may include, without limitation, (i) a unique identifier (e.g., resource name) of a Customer Managed Key (CMK), (ii) a unique name for the first storage container 146(1) (which will contain the encrypted data 156 relating to the results of the scan), (iii) a unique name for the second storage container 146(2) (which may store access logs for the first storage container 146(1), etc.), and the like. The customer 106 may choose to leave either or both of the storage containers 146 unnamed, if desired. In this scenario, a random storage container name(s) may be generated by the automated security assessment service 134 for the storage container(s) 146.

At 306A, the computing device(s) of the service provider network 102 may create the storage containers 146 associated with the use of the scanner 132 on behalf of the customer 106. For example, the first storage container 146(1) - for storing the encrypted data relating to reported misconfigurations of Internet-accessible VM instances 118 - may be created at block 306A. This first storage container 146(1) may be blocked to public access, may have Server-Side encryption using the unique identifier (e.g., resource name) of the CMK specified in the customer's 106 parameter settings, and may have server access logging enabled. The second storage container 146(2) may also be created at block 306A. In some embodiments, at block 306A, an IAM Policy for the scanner 132 is created, and an IAM Role is created for the IAM Policy.

Figure 3B:
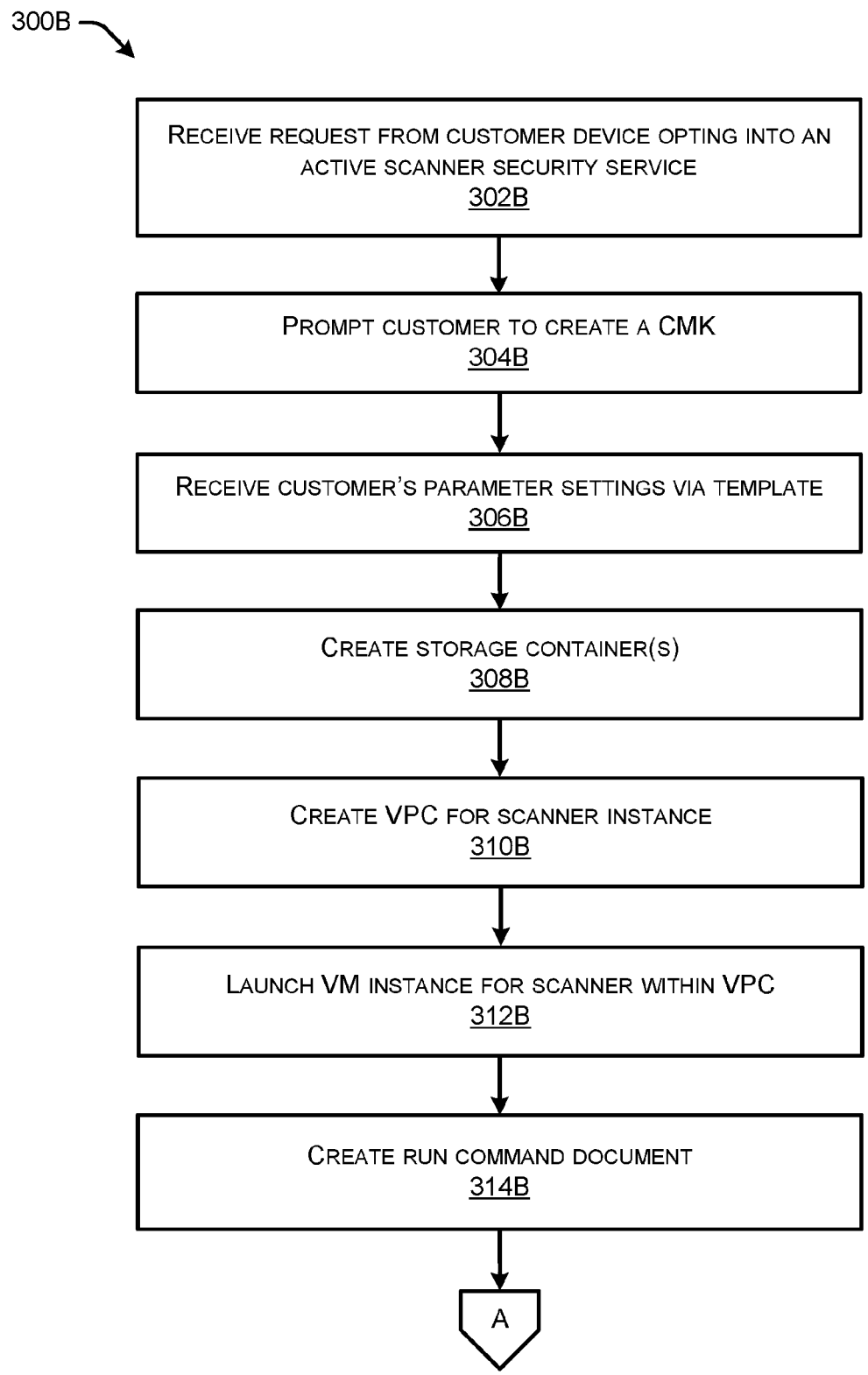
FIG. 3B illustrates a flow diagram of an example process for setting up a scanner tool based on a customer request to opt-in to an active scanner security service, according to another embodiment.

At 308A, the computing device(s) of the service provider network 102 may provision a scanning infrastructure for implementing the scanner 132. With the scanning infrastructure provisioned, the scanner 132 may identifying misconfigured instances that expose security vulnerabilities. FIG. 3B illustrates a flow diagram of an example process 300B for setting up a scanner tool 132 based on a customer request to opt-in to an active scanner security service, according to another embodiment. For discussion purposes, the process 300B is described with reference to the previous figures.

At 302B, a computing device(s) of a service provider network 102 may receive an request from a customer device 108 for a customer 106 to opt into an active scanner security service. In some embodiments, this may result in the customer 106 being whitelisted with other customers 106 who have opted into the active scanner security service. In some embodiments, this opt-in request may result in granting permissions for particular components of, or used by, the automated security assessment service 134 in order to access the customer's 106 account ID for their customer account. Additional whitelisting of services may occur on-demand.

At 304B, the computing device(s) of the service provider network 102 may prompt customer 106, via the customer device 108, to create a Customer Managed Key (CMK) using a key management service of the service provider network 102. The customer 106 may create a CMK, assign the proper Identity Access Management (IAM) users and roles as key administrators, and may note the unique identifier (e.g., resource name) of the CMK.

At 306B, the computing device(s) of the service provider network 102 may receive parameter settings that the customer 106 input into a template. For example, the customer 106 may use the customer device 108 to navigate to a console in the region the customer 106 wants to run the scanner tool 132, and, from the console, the customer 106 may launch a program stack to open a template. The customer 106 may input template parameters that are received as the parameter settings at block 306B. These parameter settings received at block 306B may include, without limitation, (i) a unique identifier (e.g., resource name) of the CMK, (ii) a unique name for the first storage container 146(1) (which will contain the encrypted data 156 relating to the results of the scan), (iii) a unique name for the second storage container 146(2) (which may store access logs for the first storage container 146(1), etc.), (iv) an existing KeyPair (e.g., selected via a dropdown menu) that can be used to Secure Shell (SSH) into the VM instance 136(1) that will be used to host the scanner 132, (v) a Classless Inter-Domain Routing (CIDR) range for the setup of the VPC 144 and its subnets (private and public), (vi) whether the customer 106 has selected on option to create a monitoring and observability service log group, and (vii) a machine image prefix for the latest machine image, which may ensure that the VM instance 136(1) used for hosting the scanner 132 will launch with the latest machine image. The customer 106 may choose to leave either or both of the storage containers 146 unnamed, if desired. In this scenario, a random storage container name(s) may be generated by the automated security assessment service 134 for the storage container(s) 146. The scanner 132 may publish the progress of its scans to the monitoring and observability service log group specified in the parameter settings, or a log group otherwise owned by the customer 106. A VPC Flow Log may be linked to another log group for monitoring the scanner's 132 VPC Flow Log.

At 308B, the computing device(s) of the service provider network 102 may create the storage containers 146 associated with the use of the scanner 132 on behalf of the customer 106. For example, the first storage container 146(1) - for storing the encrypted data relating to reported misconfigurations of Internet-accessible VM instances 118 - may be created at block 308B. This first storage container 146(1) may be blocked to public access, may have Server-Side encryption using the unique identifier (e.g., resource name) of the CMK specified in the customer's 106 parameter settings, and may have server access logging enabled. The second storage container 146(2) may also be created at block 308B. In some embodiments, at block 308B, an IAM Policy for the scanner 132 is created, and an IAM Role is created for the IAM Policy.

At 310B, the computing device(s) of the service provider network 102 may create a VPC 144 so that the VM instance 136(1) is launched in a private subnet(s) 142 behind its own NAT Gateway.

At 312B, the computing device(s) of the service provider network 102 may launch a VM instance 136(1) that executes within the private subnet(s) 142 of the VPC 144 created at block 310B. The instance 136(1) may be launched with the latest machine image. In some embodiments, the IAM Role may be attached to the instance 136(1). The scanner 132 and its dependencies may be installed onto the VM instance 136(1), and the installed files that belong to the scanner 132 may be signed with the scanner's 132 GNU Privacy Guard (GPG) key. This allows for validating the fingerprint of the GPG key, and then validating the signature of individual files used for the scanner 132. In some embodiments, a VPC Flow Log is associated with the VPC 144 created at block 310B, with Flow Logs being directed towards the monitoring and observability service log group specified in the customer's 106 parameter settings, or, if the parameter settings do not include a monitoring and observability service log group, the Flow Logs may remain unpublished.

At 314B, the computing device(s) of the service provider network 102 may create a run command document that is to be used to update and run the customer's 106 scanner 132 for identifying misconfigured instances. In some embodiments, the customer 106 may add the IAM Role to the list of users for their CMK at block 314B.

Figure 4:
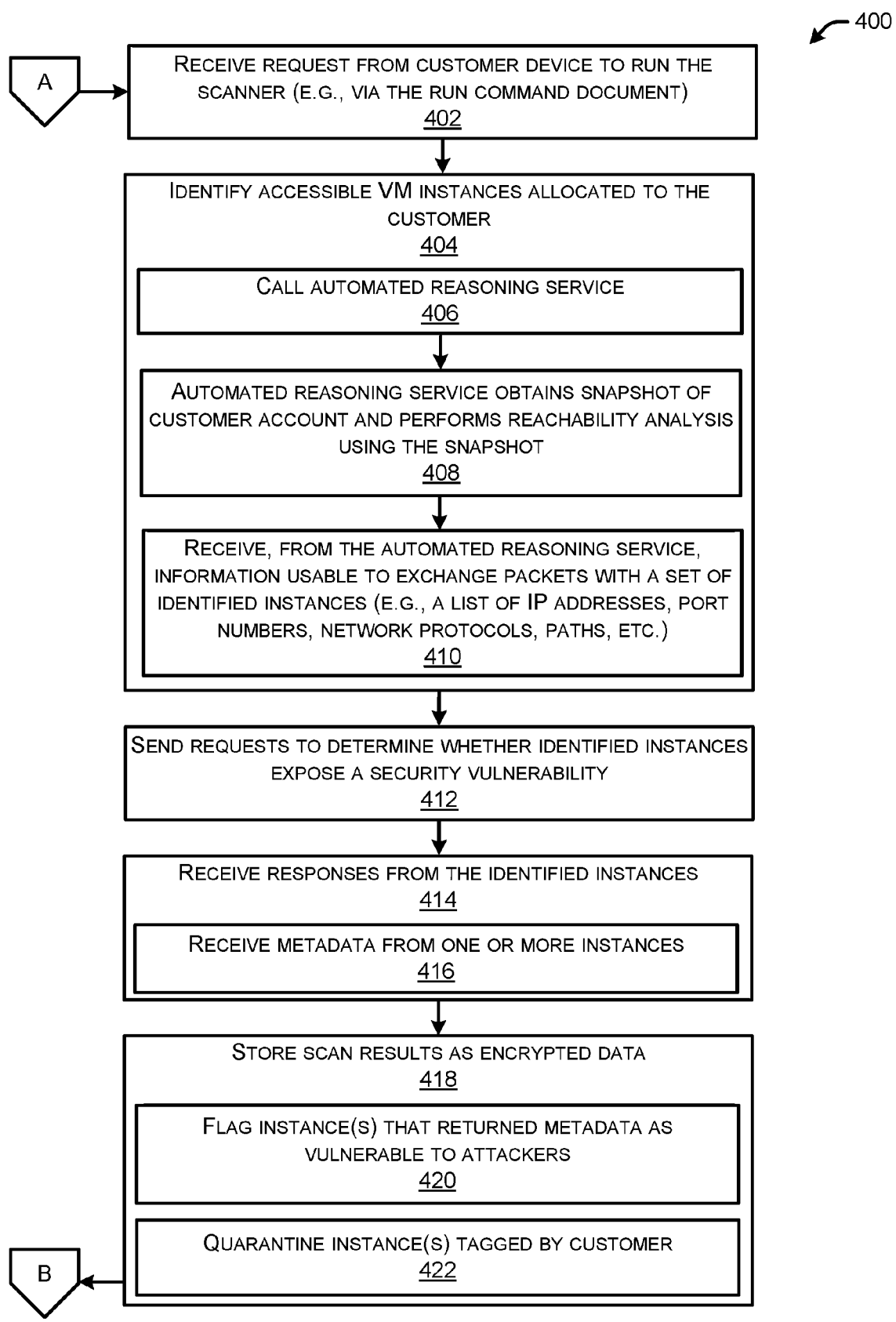
FIG. 4 illustrates a flow diagram of an example process for identifying accessible (e.g., Internet-accessible) instances of a customer that are vulnerable to attackers.

FIG. 4 illustrates a flow diagram of an example process 400 for identifying accessible (e.g., Internet-accessible) instances of a customer 106 that are vulnerable to attackers. As shown by the off-page reference "A" in FIGS. 3A/B and 4, the process 400 may continue from block 314 of the process 300, after the VM instance 136(1) has been launched in the VPC 144 to host the scanner 132, as depicted in FIG. 1. For discussion purposes, the process 400 is described with reference to the previous figures.

At 402, a computing device(s) of a service provider network 102 may receive, from a customer device 108 of a customer 106, a request to run the scanner 132 that the customer setup using the template parameters in the process 300. Running the scanner 132 may scan the customer account of the customer 106 and report misconfigurations of Internet-accessible VM instances amongst a plurality of VM instances allocated to the customer 106. In some embodiments, the request received at block 402 may be made using the run command document created at block 314 of the process 300.

It is to be appreciated that block 402 illustrates an example where the scanner 132 can be run on-demand, at the request of the customer 106. Additionally, or alternatively, other triggering events may cause the scanner 132 to run a scan of the customer account. For example, the customer 106 launching a new instance 118 may trigger the scanner 132 to run. As another, example, the passage of a period of time may trigger the scanner 132 to run, such as when the scanner 132 is configured to periodically scan the customer account of a customer 106. As yet another example, a risk assessment of data accessible to instances 118 of a customer account may be made to determine whether scanning is to be triggered. For example, if a customer 106 stores sensitive data, such as Health Insurance Portability and Accountability Act (HIPPA) data, Payment Card Industry (PCI) data, etc., this may trigger the scanner 132 to run a scan of the customer account to see if any instances that with access to that sensitive data are misconfigured.

At 404, the computing device(s) of the service provider network 102 may identify, as one or more identified instances of one or more VM instances allocated to the customer 106, one or more VM instances 118 that can be accessed (e.g., via the Internet). As shown by the sub-blocks within block 404, the identification of accessible (e.g., Internet-accessible) VM instances may include multiple operations.

At sub-block 406, the computing device(s) of the service provider network 102 call an automated reasoning service 204 to identify accessible instances. This call made at sub-block 406 may request the automated reasoning service 204 to obtain a snapshot 210 of the network configuration for the customer account of the customer 106, and to identify, from the snapshot 210, instances that are to be scanned for security vulnerabilities.

At sub-block 408, the automated reasoning service 204 may obtain the snapshot 210 and may perform a reachability analysis using the snapshot 210. This snapshot 210 may model the network configuration for the customer account as a data file (e.g., a JSON object). As described herein, the snapshot 210 includes the plurality of VM instances allocate to the customer 106 within the service provider network 102; some of which may be accessible (e.g., via the Internet), and some of which may not be accessible (e.g., via the Internet).

The reachability analysis performed at sub-block 408 may determine, based at least in part on the snapshot 210, whether any of the one or more VM instances allocated to the customer 106 are accessible (e.g., via the Internet) through a port that is within a range of port numbers (e.g., via Ports 80 (HTTP), 443 (HTTPS), 3128, etc.). For these accessible instances, the automated reasoning service 204 may further determine a set of network protocols usable to connect to the identified instance(s) 118 via the ports, as well as IP addresses associated with the instances. In some embodiments, one or more paths (e.g., ingress paths from the Internet) to each identified instance 118 may be determined using the reachability analysis so that the scanner 132 may check the one or more paths to determine whether a security vulnerability is exposed via any of the paths.

At sub-block 410, the computing device(s) of the service provider network 102 may receive, from the automated reasoning service 204, information that is usable to exchange packets with instances identified by the automated reasoning service 204. This information, for example, may include a list of IP addresses, port numbers, and network protocols (e.g., HTTP, HTTPS, etc.) usable to connect to a set of identified, accessible (e.g., Internet-accessible) instances 118 via the ports associated therewith. In some embodiments, the information received at sub-block 410, may include paths from the Internet to the identified instances 118.

At 412, the computing device(s) of the service provider network 102 may use the information received at sub-block 740 to send (e.g., over the Internet) a request(s) 214 to an identified instance(s) 118 that was/were identified at block 404. The request 214 may be constructed in a manner that allows for determining whether the scanner 132 can obtain access to information that the scanner 132 is not supposed to be able to access via the Internet. For example, the scanner 132 may construct a request 214 that requests a process running on a proxy 124 of an identified instance 118 to return information that would expose a security vulnerability if the information were to be made available to the scanner 132 via the Internet. In some embodiments, the request(s) 214 may be constructed in order to request that the identified instance(s) 118 return metadata associated with the identified instance(s) 118, such as a request to return an ID of a machine image that was used to launch the identified instance(s) 118. The request(s) 214 sent at block 412 may correspond to a network protocol(s) of the set of network protocols identified by the reachability analysis of the automated reasoning service 204, which protocol(s) is/are usable to listen on a port(s) of an accessible instance(s) 118. Furthermore, the sending of the request(s) 214 to the identified instance(s) 118 at block 412 may be sent using the IP address(es) and the port number(s) determined at sub-block 410. The requests 214 may be constructed using parameters that cause the requests 214 to traverse specific paths from the Internet to the identified instances 118, the paths having been determined from the reachability analysis of the automated reasoning service 204, for example. In this way, the request 214 mimics an incoming packet that is typically received by the instance 118 via that path. For example, if a path is determined from the Internet, via the IGW 130, through a load balancer, to the instance 118 in question, the parameters of the request 214 may include the IP addresses and the ports along the path that includes the load balancer.

At 414, the computing device(s) of the service provider network 102 may receive responses 220 from the identified instances 118 (e.g., over the Internet). Based on the responses 220, the scanner 132 may determine whether any of the identified instances 118 expose a security vulnerability via ports associated with the identified instances 118. For example, at sub-block 416, the computing device(s) of the service provider network 102 may receive, in one or more of the responses 220, requested metadata, which may be indicative of the exposure of a security vulnerability. In some embodiments, the metadata received at sub-block 416 from the identified instance(s) 118 may comprise an ID of a machine image that was used to launch the identified instance(s) 118.

At 418, the computing device(s) of the service provider network 102 may store, in storage 146 of a network-based storage service 148, and in association with the customer account of the customer 106, scan results (or findings) based on the response(s) 220 received from the identified instance(s) 118 at block 414 as encrypted data 156. At sub-block 420, the computing device(s) of the service provider network 102 may store at least some of the encrypted data 156 in the storage 146 of the network-based storage service 148 to indicate that one or more of the identified instances is/are vulnerable to attackers based on the responses 218 received from the one or more identified instances. For example, one or more instances 118 may be flagged as vulnerable based at least in part on receiving the metadata from those one or more instances. For example, this may be flagged in the first storage container 146(1) by presenting a particular visual indicator in association with an identifier of a vulnerable instance 118, and/or presenting text that states the instance 118 is vulnerable to attackers. In some embodiments, the encrypted data 156 for vulnerable instances includes a suggestion for the customer 106 to reconfigure the identified, vulnerable instance 118 to prevent attackers from accessing the metadata and/or other sensitive customer data (e.g., credentials, such as a secret key, access key, etc.). Such a suggestion may include, without limitation, a suggestion to close the port(s) associated with the flagged instance 118, a suggestion to change the configuration so that a proxy 124 running on the instance 118 is no longer a forward proxy to a metadata service, and the like. At sub-block 422, if the parameter settings input by the customer 106 include a tag associated with one or more of the instances identified/flagged as vulnerable (i.e., if the tag was assigned to the identified instance(s) by the customer 106 prior to running the scanner 132), the computing device(s) of the service provider network 102 may quarantine the identified instance(s) based at least in part on the tag, such as by pausing execution of the identified instance(s). In this manner, any downstream effects of the vulnerability may be mitigated by preventing attackers from exploiting the vulnerable instance until the customer 106 can re-configured the instance. Obtaining the customer's 106 authorization before quarantining instances on their behalf prevents unexpected service interruptions for the customer 106.

Figure 5:
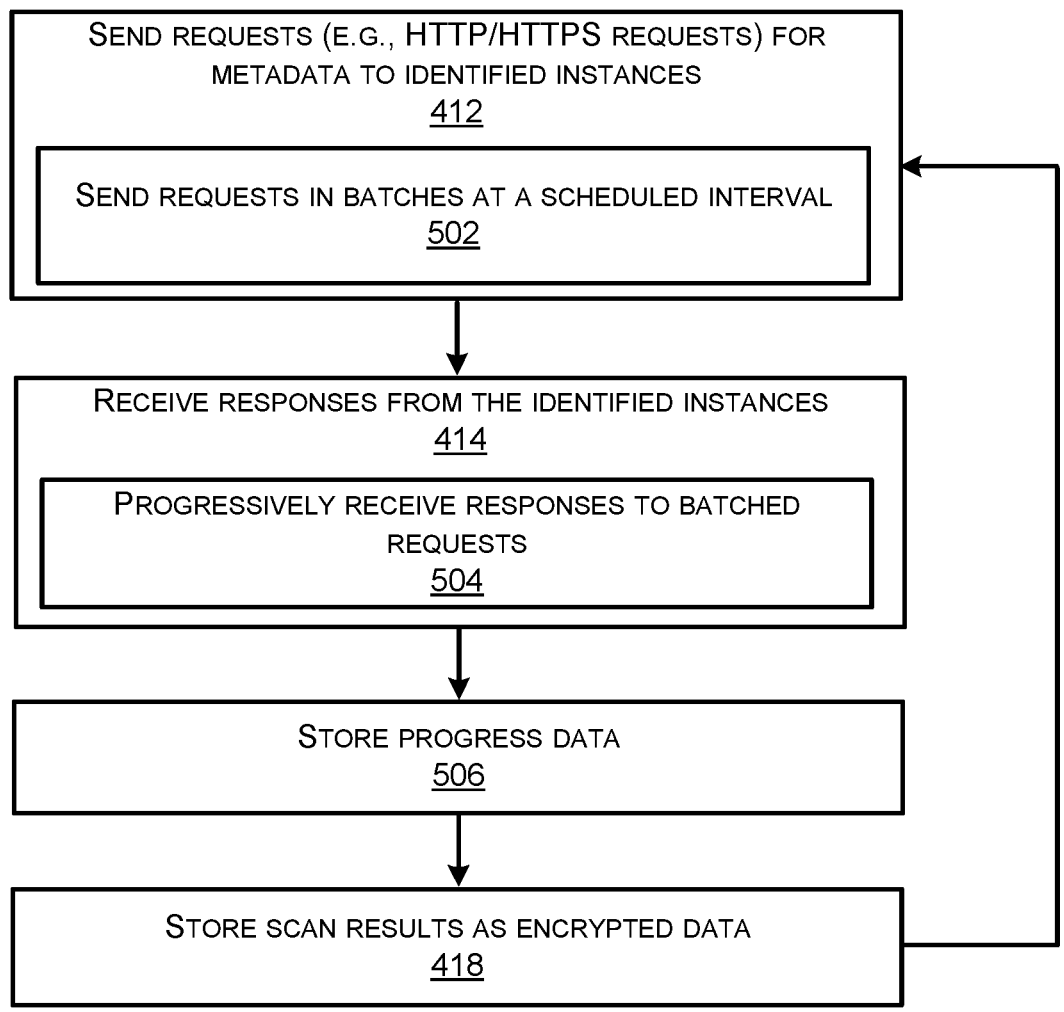
FIG. 5 illustrates a flow diagram of an example process for sending requests to Internet-accessible instances in batches of requests at a scheduled interval.

FIG. 5 illustrates a flow diagram of an example process 500 for sending requests 214 to Internet-accessible instances 118 in batches 216 of requests 214 at a scheduled interval. For discussion purposes, the process 500 is described with reference to the previous figures.

At 502, as part of sending the requests 214 (e.g., HTTP/HTTPS requests) at block 412 of the process 400, for example, a computing device(s) of the service provider network 102 may send requests 214 in batches to respective subsets 218 of the identified instances 118 (i.e., identified as being accessible via the Internet) at a scheduled interval. For example, the computing device(s) of the service provider network 102 may send, over the Internet, a first batch 216 (1) of first requests 214 to a first subset 218(1) of multiple identified instances 118 identified as being Internet-accessible, the requests 214 in the first batch 216(1) requesting that the first subset 218(1) of the multiple identified instances 118 return the metadata. Subsequently, the computing device(s) of the service provider network 102 may send, over the Internet, a second batch 216(2) of second requests 214 to a second subset 218(2) of the multiple identified instances 118 requesting that the second subset 218(2) of the multiple identified instances 118 return the metadata. This may continue for any suitable number of subsets 218 that constitute a complete set of identified instances 118. In some embodiments, the number of requests 214 in each batch 216 is anumber set by the scanner 132 by default (e.g., 10 requests per batch). In some embodiments, the individual batch 216 include a number of requests 214 that is based at least in part on a parameter setting in the customer account that was set by the customer 106. For example, if the customer 106 input a parameter setting to have requests 214 sent to Internet-accessible instances in batches of 100, 200, 500, etc., then the batches 216 may include the customer-specified number of requests 214.

At 504, as part of receiving responses 220 from the identified instances 118 at block 414 of the process 400, for example, the computing device(s) of the service provider network 102 may progressively receive responses 220 to the requests 214 sent in batches at a scheduled interval at block 502. Again, if any of the identified instances 118 are misconfigured, the computing device(s) of the service provider network 102 may, at block 504, receive, over the Internet, metadata from the misconfigured instance(s).

At 506, the computing device(s) of the service provider network 102 may store progress data indicating a progress of sending the requests 214 in batches 216 to the multiple identified instances 118. For example, the progress data may indicate something like "10 out of your 500,000 instances have been scanned." The storing of the progress data at block 506 may include publishing the progress of the scan to a monitoring and observability service log group specified in the customer's 106 parameter settings.

At 418, as described above with reference to the process 400, the computing device(s) of the service provider network 102 may store, in storage 146 of a network-based storage service 148, and in association with the customer account of the customer 106, scan results (or findings) based on the response(s) 220 received from the identified instance(s) 118 at block 414 as encrypted data 156. At least some of the encrypted data 156 stored in the storage 146 of the network-based storage service 148 may indicate that one or more of the identified instances is/are vulnerable to attackers based at least in part on receiving the metadata from those one or more instances. The process 500 may iterate in this manner as requests 214 are continually sent in batches 216, and as responses 220 to those requests 214 are received from identified instances 118.

Figure 6:
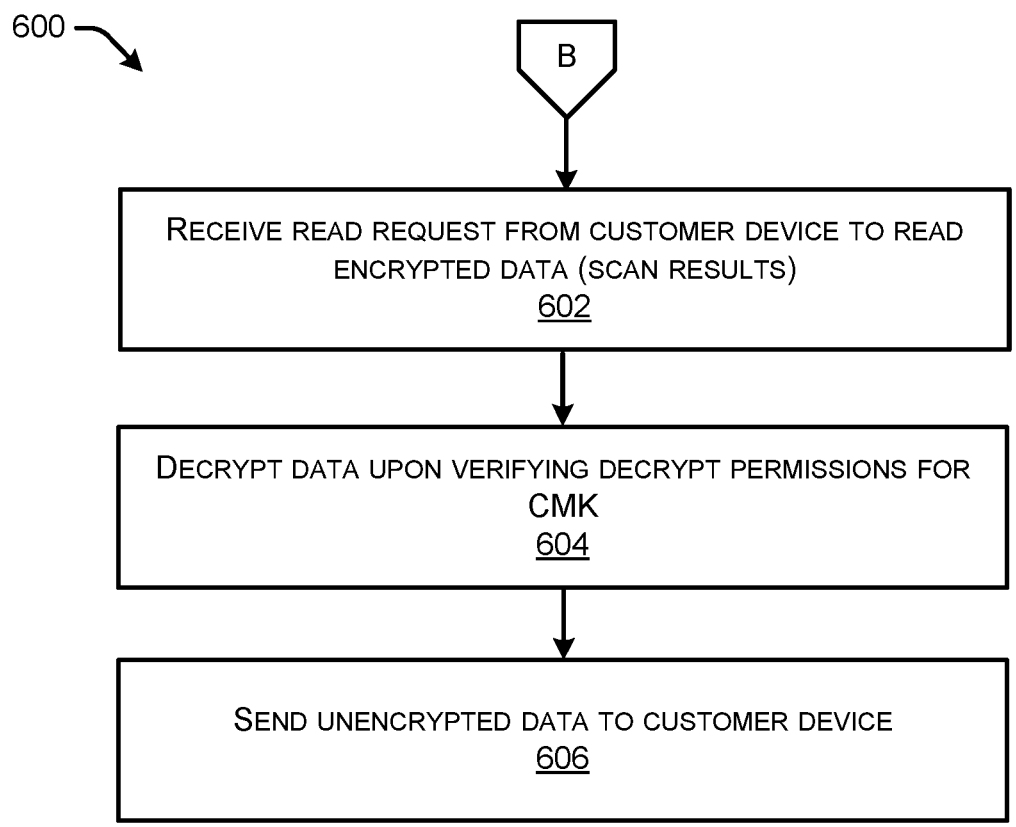
FIG. 6 illustrates a flow diagram of an example process for providing a customer access to the scan results of the scanner.

FIG. 6 illustrates a flow diagram of an example process 600 for providing a customer 106 access to the scan results of the scanner 132. As shown by the off-page reference "B" in FIGS. 4 and 6, the process 600 may continue from block 418 of the process 400, after scan results of the scanner 132 have been stored in customer-accessible storage 146 of a network-based storage service 148. For discussion purposes, the process 600 is described with reference to the previous figures.

At 602, a computing device(s) of the service provider network 102 may receive, from a customer device 108, a read request to read encrypted data 156 stored in a first storage container 146(1) of a network-based storage service 148.

At 604, the computing device(s) of the service provider network 102 may decrypt the encrypted data 156 to obtain unencrypted data, which may include at least some data indicating that one or more identified instances 118 are vulnerable to attackers. Decryption may be based on the customer device 108 and/or the customer 106 having decrypt permissions for the CMK that was created by the customer 106 for setting up the scanner 132.

At 606, the computing device(s) of the service provider network 102 may send the unencrypted data to the customer device 108. In this manner, the customer 106 may view the unencrypted scan results to see if any of the customer's 106 instances have been flagged as vulnerable, and, if so, the customer 106 may take remedial action, if desired, such as reconfiguring the instance, tearing down the instance altogether, etc.

Figure 7:
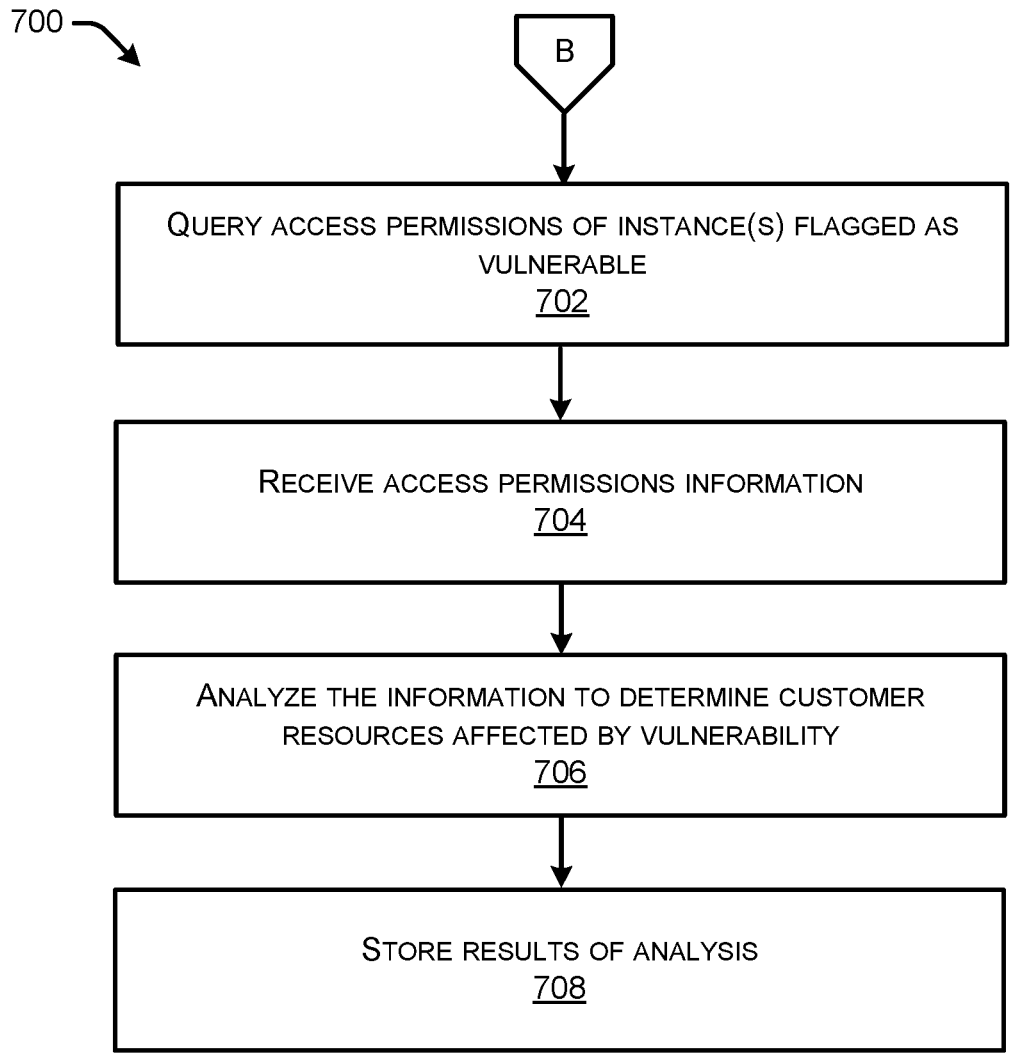
FIG. 7 illustrates a flow diagram of an example process for determining an extent of a vulnerability detected in an Internet-accessible instance.

FIG. 7 illustrates a flow diagram of an example process 700 for determining an extent of a vulnerability detected in an Internet-accessible instance. As shown by the off-page reference "B" in FIGS. 4 and 7, the process 700 may continue from block 418 of the process 400, after scan results of the scanner 132 have been stored in customer-accessible storage 146 of a network-based storage service 148. For discussion purposes, the process 700 is described with reference to the previous figures.

At 702, a computing device(s) of the service provider network 102 may send a query to a policy analysis service requesting to determine access permissions of an identified instance that is flagged in the scan results as being vulnerable to attackers.

At 704, the computing device(s) of the service provider network 102 may receive information from the policy analysis service about the access permissions of the identified instance.

At 706, the computing device(s) of the service provider network 102 may analyze the information received at block 704 to determine customer resources affected by the vulnerability. For example, the analysis at block 706 may determine that a number of the customer's 106 storage resources (e.g., storage containers 146) are accessible by the vulnerable instance, and/or that other resources of the customer may be adversely affected by the vulnerability. This may indicate that the vulnerable instance's policy is overly broad, and that the customer account of the customer 106 is vulnerable to a particular type of attack, where an attacker may be able to exploit a vulnerability of the identified instance to gain access to other resources of the customer 106.

At 708, the computing device(s) of the service provider network 102 may store results of the analysis performed at block 706, such as in a customer-accessible storage container 146(1). This may allow the customer 106 to determine the "blast radius" of an identified vulnerability, which may help the customer 106 decide how to respond to the identified vulnerability.

Figure 8:
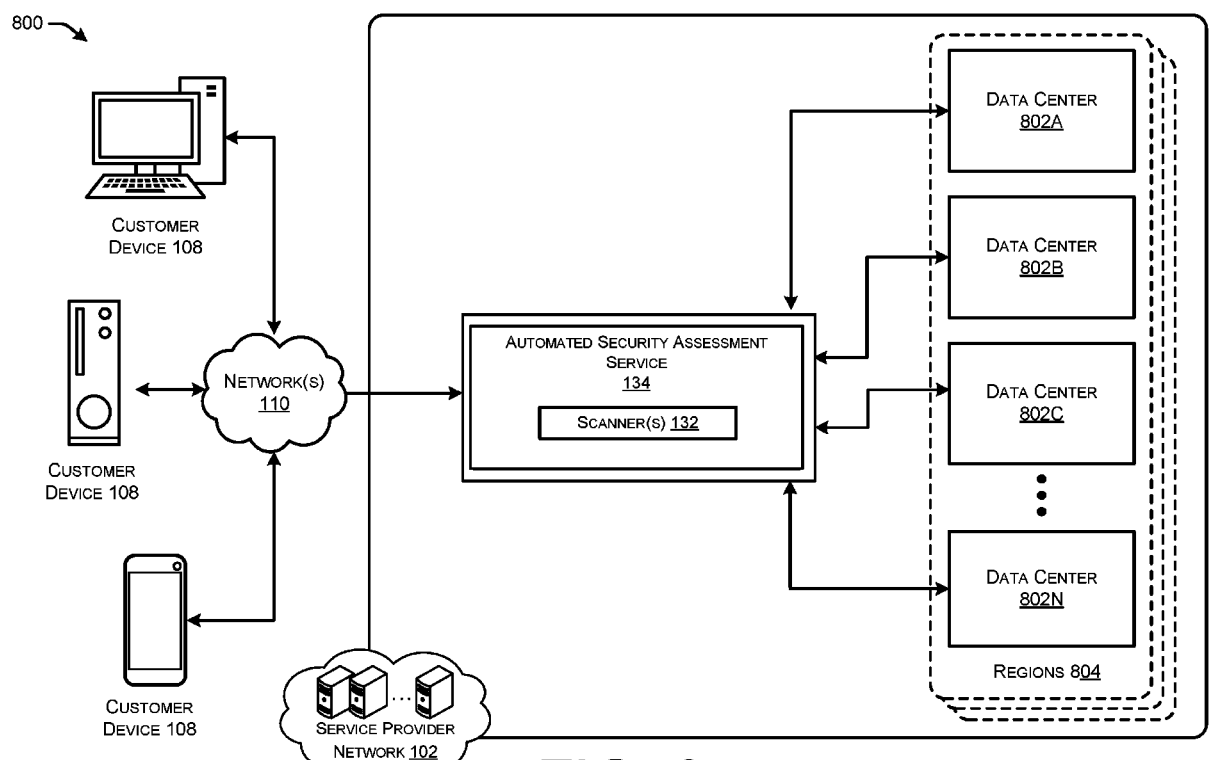
FIG. 8 is a system and network diagram that shows an illustrative operating environment that includes a service provider network that can be configured to implement aspects of the functionality described herein.

FIG. 8 is a system and network diagram that shows an illustrative operating environment 800 that includes a service provider network 102 that can be configured to implement aspects of the functionality described herein. The service provider network 102 can provide computing resources, like VM instances 118/136 and storage 146, on a permanent or an as-needed basis. Among other types of functionality, the computing resources provided by the service provider network 102 may be utilized to implement the various services and components described above. As also discussed above, the computing resources provided by the service provider network 102 can include various types of computing resources, such as data processing resources like VM instances 118/136, data storage resources, networking resources, data communication resources, network services, and the like.

Each type of computing resource provided by the service provider network 102 can be general-purpose or can be available in a number of specific configurations. For example, data processing resources can be available as physical computers or VM instances 118/136 in a number of different configurations. The VM instances 118/136 can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 802A-802N (which might be referred to herein singularly as "a data center 802" or in the plural as "the data centers 802"). The data centers 802 are facilities utilized to house and operate computer systems and associated components. The data centers 802 typically include redundant and backup power, communications, cooling, and security systems. The data centers 802 can also be located in geographically disparate locations, or regions 804. One illustrative embodiment for a data center 802 that can be utilized to implement the technologies disclosed herein will be described below with regard to FIG. 9.

The customers 106 that utilize the service provider network 102 may access the computing resources provided by the service provider network 102 over any wired and/or wireless network(s) 110, which can be a wide area communication network ("WAN"), such as the Internet, an intranet or an Internet service provider ("ISP") network or a combination of such networks. For example, and without limitation, a customer device 108 operated by customer 106 of the service provider network 102 may be utilized to access the service provider network 102 by way of the network(s) 110. It should be appreciated that a local-area network ("LAN"), the Internet, or any other networking topology known in the art that connects the data centers 802 to remote clients and other users can be utilized. It should also be appreciated that combinations of such networks can also be utilized. As illustrated, the automated security assessment service 134 may manage the deployment of scanners 132 on behalf of opted-in customers 106, as described herein.

Figure 9:
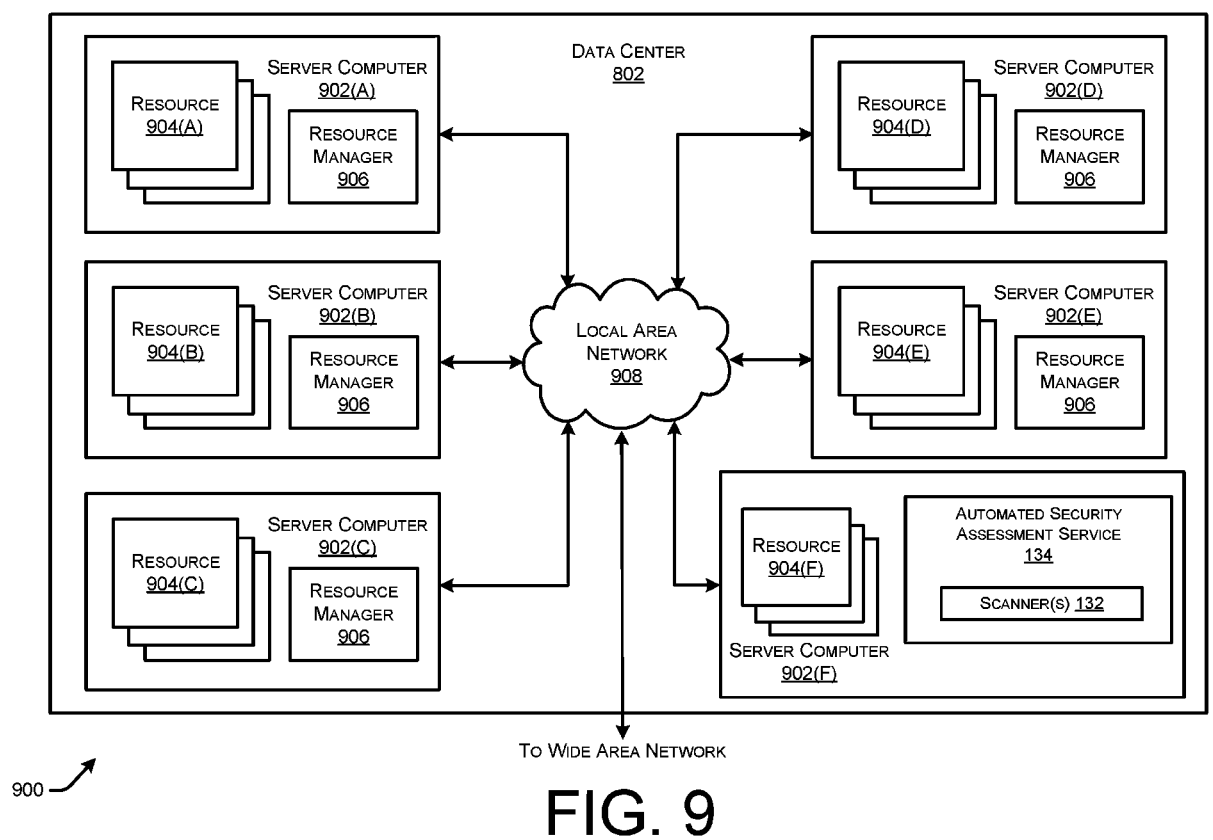
FIG. 9 is a computing system diagram illustrating a configuration for a data center that can be utilized to implement aspects of the technologies disclosed herein.

FIG. 9 is a computing system diagram 900 that illustrates one configuration for a data center 802 that implements aspects of the technologies disclosed herein. The example data center 802 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing resource network 116 and/or 140 described herein.

The server computers 902 can be standard tower, rackmount, or blade server computers configured appropriately for providing the computing resources described herein (illustrated in FIG. 9 as the computing resources 904A-904E). The computing resources provided by the service provider network 102 can be data processing resources such as VM instances 118/136 or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances 118/136, for example, the resource manager 906 can be a hypervisor or another type of program configured to enable the execution of multiple VM instances 118/136 on a single server computer 902. Server computers 902 in the data center 802 can also be configured to provide network services and other types of services.

In the example data center 802 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 802A-802N, between each of the server computers 902A-902F in each data center 802, and, potentially, between computing resources in each of the server computers 902. It should be appreciated that the configuration of the data center 802 described with reference to FIG. 9 is merely illustrative and that other implementations can be utilized.

The data center 802 shown in FIG. 9 also includes a server computer 902F that can execute some or all of the software components described above. For example, and without limitation, the server computer 902F (and the other server computers 902) can generally correspond to a server/computing device configured to execute components including, without limitation, the automated security assessment service 134 that manages the deployment of scanners 132 on behalf of opted-in customers 106, as described herein, and/or the other software components described above. The server computer 902F can also be configured to execute other components and/or to store data for providing some or all of the functionality described herein. In this regard, it should be appreciated that the components illustrated in FIG. 9 as executing on the server computer 902F can execute on many other physical or virtual servers in the data centers 802 in various embodiments. Thus, the data center 802 in FIG. 9 may also include a plurality of server computers 902 that execute a fleet of VM instances 118/136. It is to be appreciated that the host computers 114/138 depicted in FIG. 1 may be any of the servicer computers 902 of FIG. 9. As such, the host computers 114/138 of FIG. 1 may be within the same data center 802. Alternatively, the host computer(s) 114 may be a server computer(s) 902 within a first data center 802A, and the host computer(s) 138 may be a server computer(s) 902 within a second data center 802B.

Figure 10:
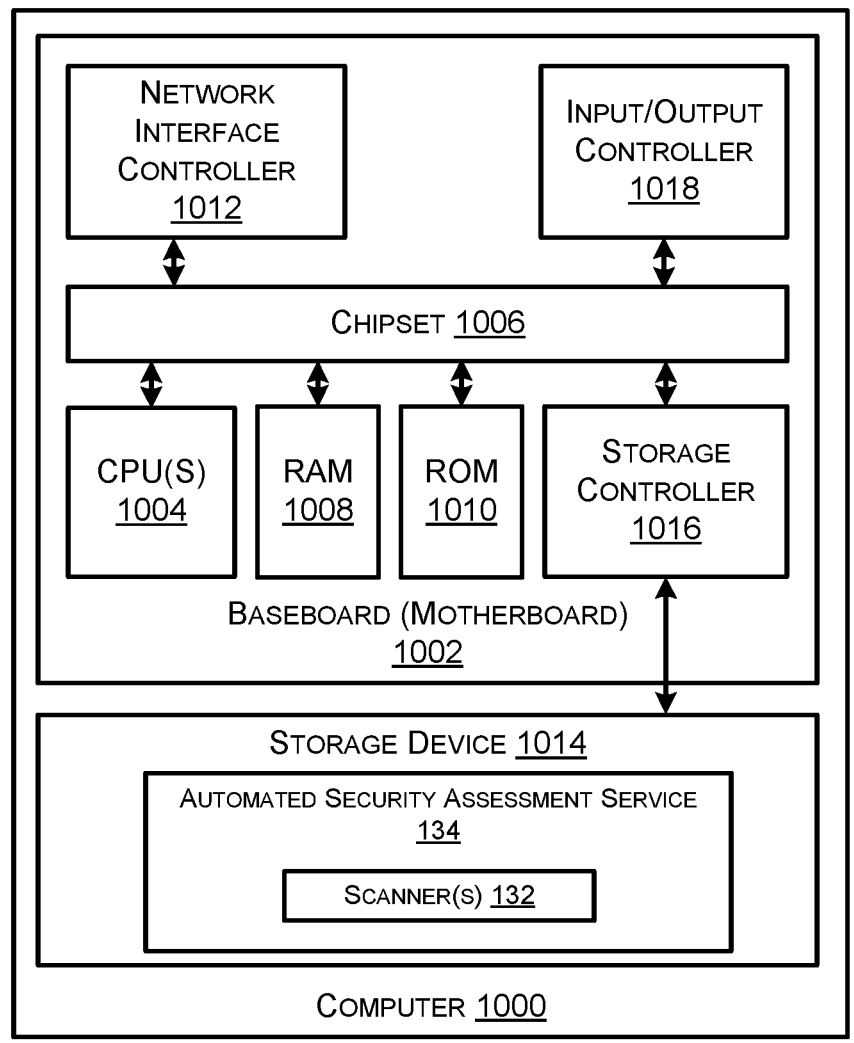
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein. In some examples, the server computer 1000 may correspond to one or more computing devices that implements the components and/or services described in FIG. 1.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a random-access memory (RAM) 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a network interface controller (NIC) 1012, such as a gigabit Ethernet adapter. The NIC 1012 is capable of connecting the computer 1000 to other computing devices over the network 908 (or 110). It should be appreciated that multiple NICs 1012 can be present in the computer 1000, connecting the computer to other types of networks and remote computer systems.

The computer 1000 can be connected to a mass storage device 1014 that provides non-volatile storage for the computer. The mass storage device 1014 can store an operating system, programs, and/or components including, without limitation, the automated security assessment service 134 that manages the deployment of scanners 132 on behalf of opted-in customers 106, as described herein, and data, which have been described in greater detail herein. The mass storage device 1014 can be connected to the computer 1000 through a storage controller 1016 connected to the chipset 1006. The mass storage device 1014 can consist of one or more physical storage units. The storage controller 1016 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1014 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1014 is characterized as primary or secondary storage, and the like.

For example, the computer 1000 can store information to the mass storage device 1014 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1014 by detecting the physical states or characteristics of one or more particular locations within the physical storage units.

In addition to the mass storage device 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components and/or services included therein, may be supported by one or more devices similar to computer 1000. Stated otherwise, some or all of the operations performed by the service provider network 102, and/or any components and/or services included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

As mentioned briefly above, the mass storage device 1014 can store an operating system utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1014 can store other system or application programs and data utilized by the computer 1000.

In one embodiment, the mass storage device 1014 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 3-8. The computer 1000 can also include computer-readable storage media having instructions stored thereupon for performing any of the other computer-implemented operations described herein.

The computer 1000 can also include one or more input/output controllers 1018 for receiving and processing input from a number of input devices, such as a keyboard, a mouse, a touchpad, a touch screen, an electronic stylus, or other type of input device. Similarly, an input/output controller 1018 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    launching one or more virtual machine (VM) instances that are accessible using parameter settings input by a customer of a service provider network, the parameter settings comprising a quarantine tag associated with a VM instance of the one or more VM instances;
    calling an automated reasoning service to identify, as one or more identified instances of the one or more VM instances allocated to the customer, the one or more VM instances that are accessible;
    receiving, from the automated reasoning service, information that is usable to exchange packets with the one or more identified instances, the information including at least a set of network protocols and a set of ports that are within a range of port numbers;

sending, by one or more computing devices of the service provider network, and using the information, a request to an identified instance of the one or more identified instances;

receiving, by the one or more computing devices and based at least in part on the request, a response from the identified instance;

determining, by the one or more computing devices and based at least in part on the response, that the identified instance exposes a security vulnerability via a port associated with the identified instance;

determining, by the one or more computing devices and based at least in part on determining that the identified instance exposes the security vulnerability, that the identified instance is the VM instance associated with the quarantine tag;

quarantining the identified instance based at least in part on the quarantine tag by pausing execution of the identified instance; and storing, by the one or more computing devices, in storage of a network-based storage service, and in association with a customer account of the customer, encrypted data indicating that the identified instance is vulnerable to attackers.

2. The method of claim 1, wherein the determining that the identified instance exposes the security vulnerability comprises determining that the response includes metadata associated with the identified instance.

3. The method of claim 2, wherein the metadata received from the identified instance in the response comprises an identifier (ID) of a machine image that was used to launch the identified instance.

4. The method of claim 1, wherein the information received from the automated reasoning service further includes one or more network paths that are usable to connect to the identified instance, the method further comprising:

prior to the sending of the request, constructing the request with parameters based on a network path of the one or more network paths received from the automated reasoning service, wherein the sending of the request comprises sending the request to the identified instance via the network path based on the parameters included in the request.

5. The method of claim 1, further comprising receiving, by the one or more computing devices, an initial request from a customer device of the customer, the initial request requesting to scan the customer account and to report misconfigurations of accessible VM instances amongst the one or more VM instances allocated to the customer, wherein the identifying and the sending are performed in response to the receiving of the initial request from the customer device.

6. The method of claim 1, wherein the identified instance executes within a public subnet of a first virtual private cloud (VPC) that was set up by the customer, the method further comprising:

launching a VM instance that executes within a private subnet of a second VPC, wherein the sending of the request to the identified instance is performed by a scanner of the VM instance executing within the private subnet of the second VPC.

7. The method of claim 1, wherein the automated reasoning service determines the information by:

obtaining a snapshot of a network configuration for the customer account, the snapshot modeling the network configuration as a data file; and determining, based at least in part on the snapshot, the set of network protocols and the set of ports that are within the range of port numbers.

8. The method of claim 7, wherein the information further includes a set of Internet Protocol (IP) addresses associated with the one or more identified instances.

9. A system comprising:

one or more processors; and non-transitory computer-readable media storing computer-executable instructions that, when executed by the one or more processors, cause the system to:

launch one or more virtual machine (VM) instances that are accessible using parameter settings input by a customer of a service provider network, the parameter settings comprising a quarantine tag associated with a VM instance of the one or more VM instances;

call an automated reasoning service to identify, as one or more identified instances of the one or more VM instances allocated to the customer, the one or more VM instances that are accessible;

receive, from the automated reasoning service, information that is usable to exchange packets with the one or more identified instances, the information including at least a set of network protocols and a set of port numbers that are within a range of port numbers;

send, using the information, a request to an identified instance of the one or more identified instances;

receive, based at least in part on the request, a response from the identified instance;

determine, based at least in part on the response, that the identified instance exposes a security vulnerability via a port associated with the identified instance;

determine, based at least in part on determining that the identified instance exposes the security vulnerability, that the identified instance is the VM instance associated with the quarantine tag;

quarantine, based at least in part on the quarantine tag, the identified instance by pausing execution of the identified instance; and store, in storage of a network-based storage service, and in association with a customer account of the customer, encrypted data indicating that the identified instance is vulnerable to attackers.

10. The system of claim 9, wherein the information received from the automated reasoning service further includes one or more network paths that are usable to connect to the identified instance, and wherein the computer-executable instructions, when executed by the one or more processors, further cause the system to:

prior to sending the request, generate the request with parameters based on a network path of the one or more network paths received from the automated reasoning service, wherein the sending of the request comprises sending the request to the identified instance via the network path based on the parameters included in the request.

11. The system of claim 9, wherein the identified instance executes within a public subnet of a first virtual private cloud (VPC) that was set up by the customer, and wherein the computer-executable instructions, when executed by the one or more processors, further cause the system to:

launch a VM instance that executes within a private subnet of a second VPC, wherein sending the request to the identified instance is performed by a scanner of the VM instance executing within the private subnet of the second VPC.

12. The system of claim 9, wherein the computer-executable instructions, when executed by the one or more processors, further cause the system to:
receive, from a customer device of the customer, the parameter settings input by the customer using the customer device as part of an opt-in request for scanning the customer account and reporting misconfigurations of accessible VM instances amongst the one or more VM instances allocated to the customer as reported misconfigurations, wherein the parameter settings include a unique identifier of a customer managed key (CMK); and
create, based at least in part on the parameter settings, a storage container associated with the customer account for storing the encrypted data relating to the reported misconfigurations;
wherein storing the encrypted data in the storage of the network-based storage service comprises storing the encrypted data in the storage container.

13. The system of claim 12, wherein the computer-executable instructions, when executed by the one or more processors, further cause the system to:
receive, from the customer device, a read request to read the encrypted data;
determine that the customer device has decrypt permissions for the CMK;
decrypt the encrypted data to obtain unencrypted data indicating that the identified instance is vulnerable to attackers; and
send the unencrypted data to the customer device.

14. The system of claim 12, wherein the parameter settings include one or more additional tags assigned to the identified instance.

15. The system of claim 9, wherein the computer-executable instructions, when executed by the one or more processors, further cause the system to:
send a query to a policy analysis service requesting to determine access permissions of the identified instance;
receive information from the policy analysis service about the access permissions of the identified instance; and
analyze the information to determine whether the customer account is vulnerable to a particular type of attack by exploiting a vulnerability of the identified instance to gain access to resources of the customer.

16. The system of claim 9, wherein the encrypted data includes a suggestion for the customer to reconfigure the identified instance to prevent the attackers from exploiting the security vulnerability.

17. The system of claim 9, wherein determining that the identified instance exposes the security vulnerability comprises determining that the response includes metadata associated with the identified instance.

18. The system of claim 9, wherein the automated reasoning service determines the information by:
obtaining a snapshot of a network configuration for the customer account, the snapshot modeling the network configuration as a data file; and
determining, based at least in part on the snapshot, the set of network protocols, a set of ports that are within the range of port numbers, and a set of Internet Protocol (IP) addresses associated with the one or more identified instances.

19. A system comprising:
one or more processors; and
non-transitory computer-readable media storing computer-executable instructions that, when executed by the one or more processors, cause the system to:
launch one or more virtual machine (VM) instances that are accessible using parameter settings input by a customer of a service provider network, the parameter settings comprising a quarantine tag associated with a VM instance of the one or more VM instances;
call an automated reasoning service to identify, as identified instances of the one or more VM instances, a plurality of VM instances allocated to the customer that are accessible via an Internet;
receive, from the automated reasoning service, and based on a snapshot of a network configuration of a customer account of the customer, a list of Internet Protocol (IP) addresses, port numbers, and network protocols that are usable to connect to the identified instances;
send, over the Internet, requests to the identified instances using the IP addresses, the port numbers, and the network protocols in the list;
receive, over the Internet and based on the requests, responses from the identified instances;
determine, based on the responses, one or more of the identified instances that expose a security vulnerability via one or more ports associated with the one or more of the identified instances;
determine, based at least in part on determining the one or more of the identified instances that expose the security vulnerability, that at least one of the one or more of the identified instances is the VM instance associated with the quarantine tag;
quarantine, based at least in part on the quarantine tag, the at least one of the one or more of the identified instances by pausing execution of the at least one of the one or more of the identified instances; and
store, in storage of a network-based storage service, and in association with the customer account, encrypted data indicating that the one or more of the identified instances are vulnerable to attackers.

20. The system of claim 19, wherein the parameter settings further comprise one or more additional tags.

21. The system of claim 19, wherein the responses comprise metadata comprising identifiers (IDs) of machine images used to launch the identified instances.

* * * * *